United States Patent
Wang et al.

(10) Patent No.: US 12,418,470 B2
(45) Date of Patent: Sep. 16, 2025

(54) NETWORKING METHOD, COMMUNICATION METHOD, AND COMMUNICATION SYSTEM FOR MULTI-MODE COMMUNICATION DEVICE, DEVICE, AND CHIP

(71) Applicants: Beijing SmartChip Microelectronics Technology Co., Ltd., Beijing (CN); State Grid Corporation of China, Beijing (CN)

(72) Inventors: Yubo Wang, Beijing (CN); Xianhui Wang, Beijing (CN); Zheng Li, Beijing (CN); Kunpeng Xu, Beijing (CN); Hongguang Dai, Beijing (CN); Deyong Xiao, Beijing (CN); Weiqi Hao, Beijing (CN); Dan Luo, Beijing (CN); Jin Shao, Beijing (CN); Yujie Xu, Beijing (CN); Zhanxia Wu, Beijing (CN); Wei Liu, Beijing (CN)

(73) Assignees: Beijing SmartChip Microelectronics Technology Co., Ltd., Beijing (CN); State Grid Corporation of China, Beijing (CN)

(*) Notice: Subject to any disclaimer, the term of this patent is extended or adjusted under 35 U.S.C. 154(b) by 340 days.

(21) Appl. No.: 18/206,074

(22) Filed: Jun. 5, 2023

(65) Prior Publication Data
US 2023/0370362 A1    Nov. 16, 2023

Related U.S. Application Data

(63) Continuation-in-part of application No. PCT/CN2022/133931, filed on Nov. 24, 2022.

(30) Foreign Application Priority Data

May 16, 2022  (CN) .......................... 202210531401.4

(51) Int. Cl.
  *H04L 45/125*  (2022.01)
  *H04L 45/02*   (2022.01)

(52) U.S. Cl.
  CPC ............ *H04L 45/125* (2013.01); *H04L 45/02* (2013.01)

(58) Field of Classification Search
  CPC .............................. H04L 45/125; H04L 45/02
  (Continued)

(56) References Cited

U.S. PATENT DOCUMENTS 7,747,752 B2 *  6/2010  Pedersen ........... H04M 3/42382
                                               709/227
11,337,274 B2 *  5/2022  Tzou ................. H04W 28/0236
  (Continued)

FOREIGN PATENT DOCUMENTS

CN    118381820 A  *  7/2024  ........ H04W 36/0009
EP      1176787 B1  * 12/2007  ......... H04L 12/5692
  (Continued)

*Primary Examiner* — Anthony Mejia

(57) ABSTRACT

Provided are a networking method, communication method, and communication system for a multi-mode communication device, a device, and a chip. The networking method includes: sending response information about available communication modes between a network access node and a to-be-connected node to the network access node, where the available communication modes are divided into a plurality of sets, and modes in each of the sets are incompatible with each other, and modes in different sets are compatible with each other; and locking an optimal mode, selected from each of the sets based on the response information, as handshake information between the two nodes when a preset negotiation result is met, such that the network access node reports corresponding routing information, and a root node updates networking routing information.

39 Claims, 9 Drawing Sheets

(58) Field of Classification Search
USPC .......................................................... 370/389
See application file for complete search history.

(56) References Cited

U.S. PATENT DOCUMENTS

| | | | |
|---|---|---|---|
| 2003/0088682 A1* | 5/2003 | Hlasny .................... | H04L 47/24 709/229 |
| 2004/0030624 A1* | 2/2004 | Nishimaki ............. | G06Q 40/00 705/35 |
| 2007/0082699 A1* | 4/2007 | Karaoguz ............... | H04L 63/08 455/553.1 |
| 2013/0077608 A1* | 3/2013 | Amini .................... | H04L 1/0041 370/337 |
| 2018/0302899 A1* | 10/2018 | Aijaz .................... | H04L 1/1887 |
| 2018/0302911 A1* | 10/2018 | Aijaz .................... | H04L 12/189 |
| 2021/0400766 A1* | 12/2021 | Tzou ...................... | H04W 88/06 |

FOREIGN PATENT DOCUMENTS

| | | | | |
|---|---|---|---|---|
| WO | WO-2008085207 A2 * | 7/2008 | ............. | H04L 47/80 |
| WO | WO-2023221447 A1 * | 11/2023 | ............. | H04B 3/544 |

* cited by examiner

NETWORKING METHOD, COMMUNICATION METHOD, AND COMMUNICATION SYSTEM FOR MULTI-MODE COMMUNICATION DEVICE, DEVICE, AND CHIP

CROSS REFERENCE TO RELATED APPLICATIONS

The present application is a Continuation-In-Part Application of PCT Application No. PCT/CN2022/133931 filed on Nov. 24, 2022, which claims the benefit of Chinese Patent Application No. 202210531401.4 filed on May 16, 2022. All the above are hereby incorporated by reference. the contents of which are incorporated herein by reference in their entirety.

TECHNICAL FIELD

The present disclosure relates to the technical field of communications, and specifically, to a networking method, communication method, networking system, and communication system for a multi-mode communication device, an electronic device, and a chip.

BACKGROUND

With the development of low-voltage communication technologies and demands for improving quality of power supply services, high-speed power line communication (HPLC) has been applied to low-voltage local communication networks in batches, which has greatly improved communication efficiency and quality. However, there are still collection-specific blind spots and rate bottlenecks in the HPLC communication. For example, due to an excessive line attenuation and other reasons, data cannot be read or the communication is unstable in some application scenarios.

In order to resolve the problem that an existing single communication mode has blind spots and instability, multi-mode communication combining HPLC, micropower wireless, narrowband power line carrier, Bluetooth, and other communication modes is gradually emerging. The multi-mode communication can avoid the blind spots and improve the communication rate and reliability. However, the following two existing multi-mode communication modes are mainly included: (1) A relay mode is adopted for communication. That is, one mode is usually preferred for the communication, and when the communication in this mode is unsuccessful, another mode is adopted to attempt the communication. (2) A plurality of communication modes are combined to achieve point-to-point interconnection, but there may be serious mutual interference between these modes, affecting the communication quality.

The existing communication modes mentioned above cannot improve the communication quality effectively by using a plurality of communication modes.

SUMMARY

The present disclosure is intended to provide a networking method, communication method, networking system, and communication system for a multi-mode communication device, an electronic device, and a chip, to add mutually incompatible communication modes to a same communication mode set, and determine an optimal communication mode in each communication mode set that can be used for communication between nodes at any two adjacent layers by using a networking discovery process and a networking negotiation process. In addition, at most one optimal communication mode in the same communication mode set can be configured at the same time point, such that a plurality of mutually compatible optimal communication modes between the nodes at the any two adjacent layers can be determined, thus ensuring high-quality communication performance after networking. Therefore, the present disclosure can make full use of cooperation between a plurality of communication modes to achieve hybrid networking communication and maximally use of the channel resources.

To achieve the above objectives, a first aspect of the present disclosure provides a networking method for a multi-mode communication device, applied to a to-be-connected node. The networking method includes: sending response information about available communication modes between a network access node and the to-be-connected node to the network access node by using a networking discovery process, where the available communication modes include communication modes in a plurality of communication mode sets, communication modes in each of the communication mode sets are incompatible with each other, and communication modes in different communication mode sets are compatible with each other; the to-be-connected node is a next-layer node of the network access node; and the response information includes an address of the to-be-connected node and characteristic parameters representing channel quality of the communication mode; and in response to that the network access node selects an optimal communication mode between the network access node and the to-be-connected node from each of the communication mode sets based on the response information, locking the optimal communication mode in each of the communication mode sets as handshake information between the network access node and the to-be-connected node by using a networking negotiation process when a preset negotiation result is met, such that the network access node reports routing information between the network access node and the to-be-connected node to a root node based on the handshake information by using a route establishment process, and the root node updates networking routing information, where at most one optimal communication mode is selected from each of the communication mode sets to obtain a plurality of optimal communication modes, and the optimal communication modes are adopted at the same time in a communication process.

A second aspect of the present disclosure provides a networking method for a multi-mode communication device, applied to a network access node. The networking method includes: receiving response information about available communication modes between the network access node and a to-be-connected node by using a networking discovery process, where the available communication modes include communication modes in a plurality of communication mode sets, communication modes in each of the communication mode sets are incompatible with each other, and communication modes in different communication mode sets are compatible with each other; the to-be-connected node is a next-layer node of the network access node; and the response information includes an address of the to-be-connected node and characteristic parameters representing channel quality of the communication mode; selecting an optimal communication mode between the network access node and the to-be-connected node from each of the communication mode sets based on the response information by using a networking negotiation process, such that the to-be-connected node locks the optimal communication mode in each of the communication mode sets as handshake information between the network access node and the to-be-connected node when a preset negotiation result is met, where at most one optimal communication mode is selected from each of the communication mode sets to obtain a plurality of optimal communication modes, and the optimal communication modes are adopted at the same time in a communication process; and reporting routing information between the network access node and the to-be-connected node to a root node based on the handshake information by using a route establishment process, such that the root node updates networking routing information.

A third aspect of the present disclosure provides a networking method for a multi-mode communication device, applied to a root node. The networking method includes: updating networking routing information based on routing information between a network access node and a to-be-connected node that is reported according to the networking method for a multi-mode communication device.

According to the above technical solutions, the present disclosure creatively determines a plurality of mutually compatible optimal communication modes between nodes at any two adjacent layers by using a networking discovery process, a communication mode negotiation process, and a route establishment process, thus ensuring high-quality communication performance after networking. Therefore, the present disclosure can make full use of cooperation between a plurality of communication modes to achieve hybrid networking communication and maximally use channel resources.

A fourth aspect of the present disclosure provides a networking system for a multi-mode communication device, applied to a to-be-connected node. The networking system includes: a networking discovery apparatus configured to send response information about available communication modes between a network access node and the to-be-connected node to the network access node by using a networking discovery process, where the available communication modes include communication modes in a plurality of communication mode sets, communication modes in each of the communication mode sets are incompatible with each other, and communication modes in different communication mode sets are compatible with each other; the to-be-connected node is a next-layer node of the network access node; and the response information includes an address of the to-be-connected node and characteristic parameters representing channel quality of the communication mode; and a networking negotiation apparatus configured to: in response to that the network access node selects an optimal communication mode between the network access node and the to-be-connected node from each of the communication mode sets based on the response information, lock the optimal communication mode in each of the communication mode sets as handshake information between the network access node and the to-be-connected node by using a networking negotiation process when a preset negotiation result is met, such that the network access node reports routing information between the network access node and the to-be-connected node to a root node based on the handshake information by using a route establishment process, and the root node updates networking routing information, where at most one optimal communication mode is selected from each of the communication mode sets to obtain a plurality of optimal communication modes, and the optimal communication modes are adopted at the same time in a communication process.

A fifth aspect of the present disclosure provides a networking system for a multi-mode communication device, applied to a network access node. The networking system includes: a networking discovery apparatus configured to receive response information about available communication modes between the network access node and a to-be-connected node by using a networking discovery process, where the available communication modes include communication modes in a plurality of communication mode sets, communication modes in each of the communication mode sets are incompatible with each other, and communication modes in different communication mode sets are compatible with each other; the to-be-connected node is a next-layer node of the network access node; and the response information includes an address of the to-be-connected node and characteristic parameters representing channel quality of the communication mode; a networking negotiation apparatus configured to select an optimal communication mode between the network access node and the to-be-connected node from each of the communication mode sets based on the response information by using a networking negotiation process, such that the to-be-connected node locks the optimal communication mode in each of the communication mode sets as handshake information between the network access node and the to-be-connected node when a preset negotiation result is met, where at most one optimal communication mode is selected from each of the communication mode sets to obtain a plurality of optimal communication modes, and the optimal communication modes are adopted at the same time in a communication process; and a route establishment apparatus configured to report routing information between the network access node and the to-be-connected node to a root node based on the handshake information by using a route establishment process, such that the root node updates networking routing information.

A sixth aspect of the present disclosure provides a networking system for a multi-mode communication device, applied to a root node. The networking system is configured to update networking routing information based on routing information between a network access node and a to-be-connected node that is reported according to the networking method for a multi-mode communication device.

For specific details and benefits of the networking system for a multi-mode communication device in the embodiments of the present disclosure, reference may be made to the above description of the networking system for a multi-mode communication device. Details are not described herein again.

A seventh aspect of the present disclosure provides a communication method for a multi-mode communication device. The communication method includes: updating networking routing information according to the networking method for a multi-mode communication device; and based on routing information between a first node and a second node that are located at each two adjacent layers and on a path from a start communication node to a target communication node in the networking routing information, performing communication between the start communication node and the target communication node.

According to the above technical solutions, the present disclosure creatively updates networking routing information according to the networking method for a multi-mode communication device; and then performs, based on routing information between a first node and a second node that are located at each two adjacent layers and on a path from a start communication node to a target communication node in the networking routing information, communication between the start communication node and the target communication node. Therefore, the present disclosure can make full use of cooperation between a plurality of communication modes to achieve hybrid networking communication and maximally use channel resources.

An eighth aspect of the present disclosure provides a communication system for a multi-mode communication device. The communication system includes: the networking system for a multi-mode communication device, configured to: update networking routing information; and a communication device configured to: based on routing information between a first node and a second node that are located at each two adjacent layers and on a path from a start communication node to a target communication node in the networking routing information, perform communication between the start communication node and the target communication node.

For specific details and benefits of the communication system for a multi-mode communication device in the embodiments of the present disclosure, reference may be made to the above description of the communication method for a multi-mode communication device. Details are not described herein again.

A ninth aspect of the present disclosure provides a computer-readable storage medium, where the computer-readable storage medium stores a computer program, and the computer program is executed by a processor to implement the networking method for a multi-mode communication device and/or the communication method for a multi-node communication device.

A tenth aspect of the present disclosure provides an electronic device. The electronic device includes a processor, and a memory configured to store a computer program executable by the processor. The processor is configured to read the computer program from the memory and execute the computer program to implement the networking method for a multi-mode communication device and/or the communication method for a multi-node communication device.

An eleventh aspect of the present disclosure provides a chip. The chip is configured to execute a computer program, and the computer program is executed by the chip to implement the networking method for a multi-mode communication device and/or the communication method for a multi-node communication device.

Other features and advantages of the present disclosure are described in detail in the following DETAILED DESCRIPTION part.

BRIEF DESCRIPTION OF THE DRAWINGS

The accompanying drawings are provided for further understanding of the embodiments of the present disclosure, and constitute a part of the specification. The accompanying drawings and the following specific implementations are intended to explain the embodiments of the present disclosure, rather than to limit the embodiments of the present disclosure. In the accompanying drawing.

Figure 13:
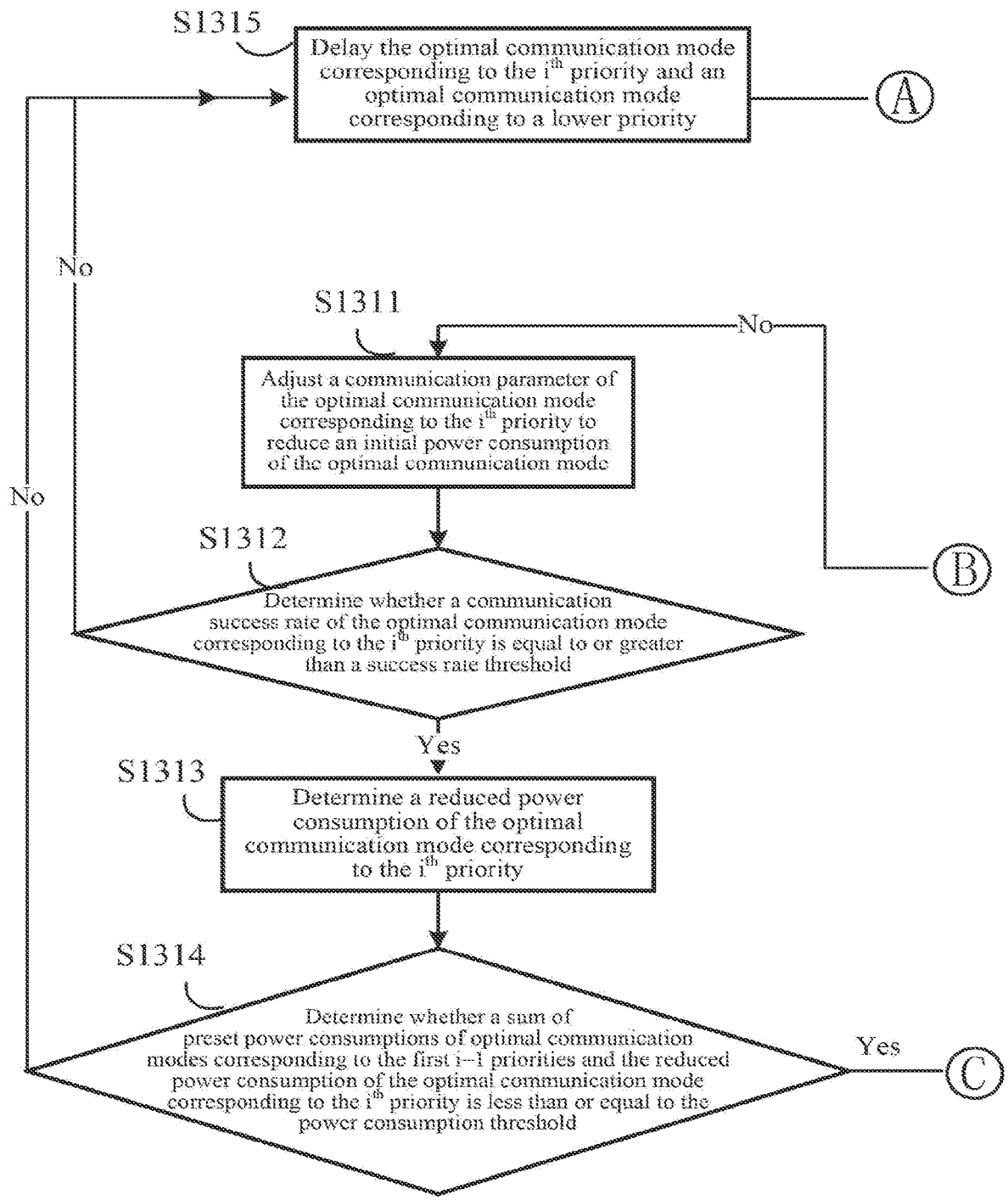
FIG. 13 is a flowchart of communication between a first node and a second node by using a power consumption control strategy according to an embodiment of the present disclosure.
Figure 13:
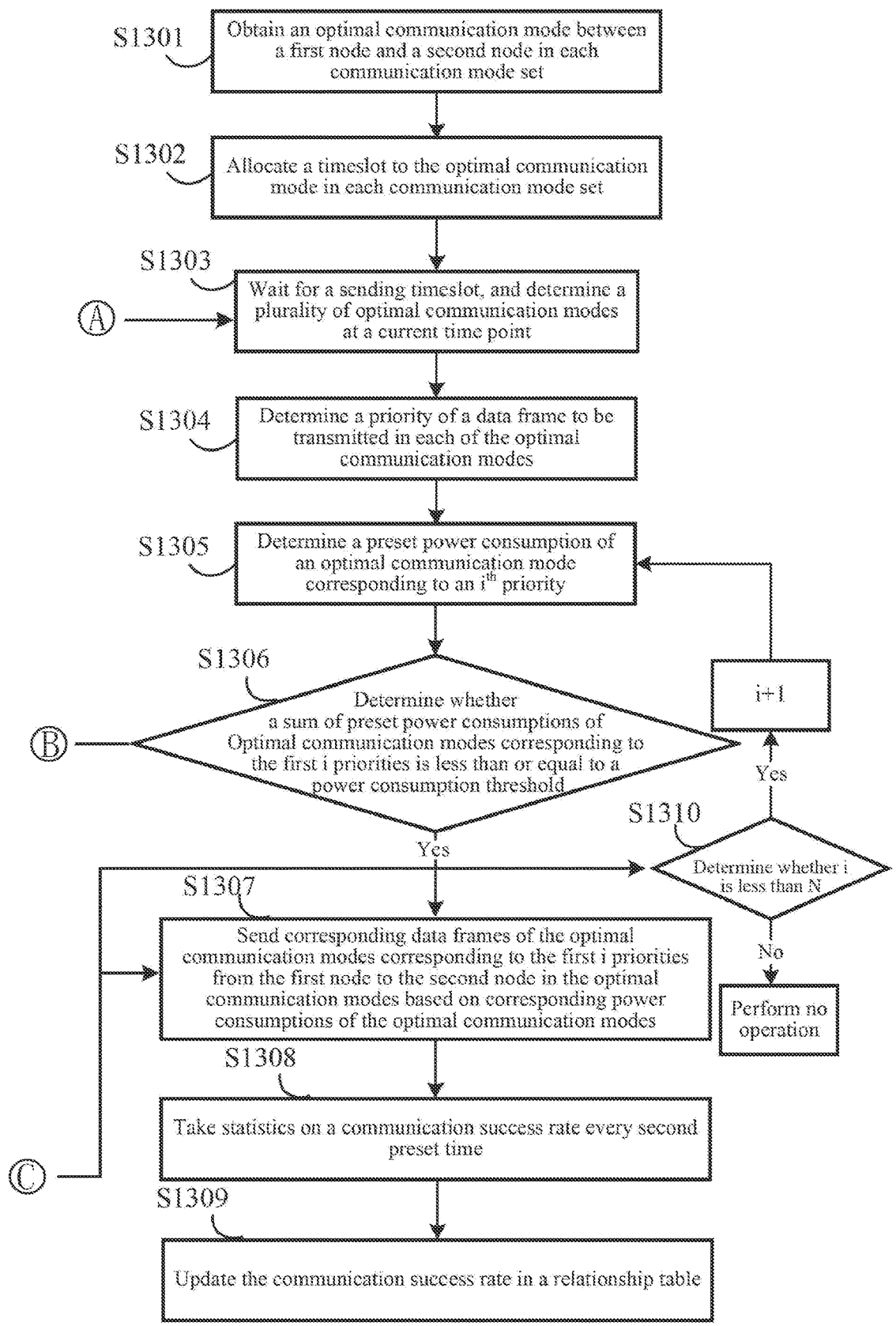

Reference numerals in FIG. 13:
S1301: Obtain an optimal communication mode between a first node and a second node in each communication mode set
S1302: Allocate a timeslot to the optimal communication mode in each communication mode set
S1303: Wait for a sending timeslot, and determine a plurality of optimal communication modes at a current time point
S1304: Determine a priority of a data frame to be transmitted in each of the optimal communication modes
S1305: Determine a preset power consumption of an optimal communication mode corresponding to an $i^{th}$ priority
S1306: Determine whether a sum of preset power consumptions of optimal communication modes corresponding to the first i priorities is less than or equal to a power consumption threshold
S1307: Send corresponding data frames of the optimal communication modes corresponding to the first i priorities from the first node to the second node in the optimal communication modes based on corresponding power consumptions of the optimal communication modes
S1308: Take statistics on a communication success rate every second preset time
S1309: Update the communication success rate in a relationship table
S1310: Determine whether i is less than N
S1311: Adjust a communication parameter of the optimal communication mode corresponding to the $i^{th}$ priority to reduce an initial power consumption of the optimal communication mode S1312: Determine whether a communication success rate of the optimal communication mode corresponding to the $i^{th}$ priority is equal to or greater than a success rate threshold S1313: Determine a reduced power consumption of the optimal communication mode corresponding to the $i^{th}$ priority S1314: Determine whether a sum of preset power consumptions of optimal communication modes corresponding to the first i−1 priorities and the reduced power consumption of the optimal communication mode corresponding to the $i^{th}$ priority is less than or equal to the power consumption threshold S1315: Delay the optimal communication mode corresponding to the $i^{th}$ priority and an optimal communication mode corresponding to a lower priority

DETAILED DESCRIPTION

The specific implementations of the present disclosure are described in detail below with reference to the accompanying drawings. It should be understood that the specific implementations described herein are merely intended to illustrate and interpret the present disclosure, rather than to limit the present disclosure.

Before various embodiments of the present disclosure are described, the following briefly describes nodes involved in the present disclosure.

A root node may be a transformer distribution fusion terminal (for example, a central concentrator (CCO)) node. A network access node, a to-be-connected node, a start communication node, a target communication node, a first node, and a second node each may be a collection terminal (namely, a multi-mode communication device), and the collection terminal can communicate with the root node. Specifically, the collection terminal may be an electric energy meter, a branch switch, a distribution network device, a sensor, or the like provided with a multi-mode communication module.

Figure 1:
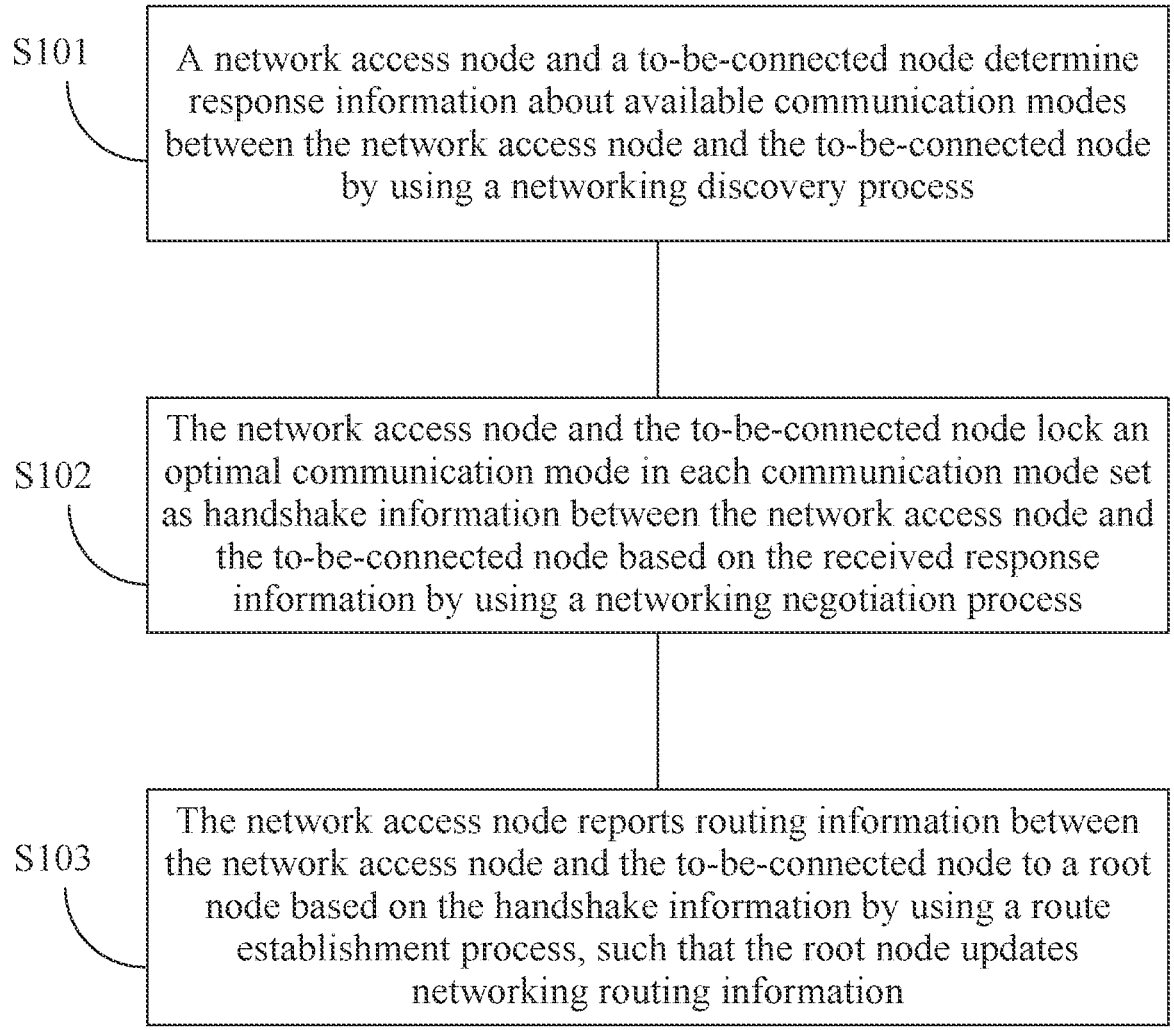
FIG. 1 is a flowchart of a networking method according to an embodiment of the present disclosure.

FIG. 1 is a flowchart of a networking method for a multi-mode communication device according to an embodiment of the present disclosure. As shown in FIG. 1, the networking method may include following steps S101 to S103.

Step S101: A network access node and a to-be-connected node determine response information about available communication modes between the network access node and the to-be-connected node by using a networking discovery process.

The available communication modes include communication modes in a plurality of communication mode sets, communication modes in each of the communication mode sets are incompatible with each other, and communication modes in different communication mode sets are compatible with each other.

Specifically, the available communication modes between the network access node and the to-be-connected node may include a plurality of communication modes. For example, the communication modes may include an HPLC communication mode, a high-speed micro-power wireless communication mode (OFDM), a low-speed micro-power wireless communication mode (GFSK), a narrowband carrier communication mode, a Bluetooth (BLE) communication mode, and the like. In addition, the communication modes may alternatively include different frequency bands of a same communication mode, for example, frequency bands 0, 1, 2, and 3 of the HPLC communication mode; or the high-speed micro-power wireless communication mode (OFDM) and the low-speed micro-power wireless communication mode (GFSK).

In this embodiment, in order to maximally use a plurality of mode resources, the above communication modes may be grouped to add mutually interfered modes (for example, different frequency bands of the HPLC communication that conflict and interfere with each other, or the high-speed micro-power wireless communication mode and the low-speed micro-power wireless communication mode that conflict and interfere with each other) to a same mode set. Therefore, the available communication modes can be divided into sets R1 to Rm, where R1={$M_{11}, M_{12}, \ldots, M_{1i}$}, R2={$M_{21}, M_{22}, \ldots, M_{2j}$}, and Rm={$M_{31}, M_{32}, \ldots, M_{3k}$}. The modes are grouped, such that the modes can be reasonably allocated in terms of time to make full use of the modes for communication, thereby improving communication quality.

The set R1 may be an HPLC communication mode set (which may specifically include: the $M_{11}$, namely, the frequency band 0, the $M_{12}$, namely, the frequency band 1, the $M_{13}$, namely, the frequency band 2, and the $M_{14}$, namely, the frequency band 3); the set R2 is a narrowband carrier communication mode set (which may include the $M_{21}$, namely, the narrowband carrier communication mode); and the set R3 is a micro-power wireless communication mode set (which may specifically include the $M_{31}$, namely, the high-speed micro-power wireless communication mode, the $M_{32}$, namely, the low-speed micro-power wireless communication mode, and the like). In each of the above mode sets, different communication modes are incompatible with each other (in other words, only one mode can be used for sending or reception at a same time point). For example, among the frequency bands 0 to 3 of the HPLC communication in the set R1, only one frequency band can be used for sending or reception (namely, communication) at a same time point. Communication modes in different communication mode sets are compatible with each other (in other words, the different sets do not affect each other). For example, the $M_{11}$, namely, the frequency band 0, in the set R1, the $M_{21}$, namely, the narrowband carrier communication mode, in the set R2, and the $M_{31}$, namely, the high-speed micro-power wireless communication mode, in the set R3 can be used for sending or reception (namely, communication) at a same time point.

The above grouping of communication modes that conflict and interfere with each other avoids interference and conflicts in a communication process, and achieve compatible communication of narrowband power line carrier, HPLC, high-speed wireless, low-speed wireless, and other communication modes.

The to-be-connected node may be a next-layer node of the network access node. For example, if the network access node is a node at a layer 1, the to-be-connected node is a node at a layer 2.

The response information may include an address of the to-be-connected node and characteristic parameters representing channel quality of the communication mode. For example, the characteristic parameter may be a signal-to-noise ratio or a signal attenuation amount. In this embodiment of the present disclosure, the available communication modes between the network access node and the to-be-connected node are preset, in other words, both the network access node and the to-be-connected node know the available communication modes between them in advance. Therefore, there is no need to transfer information of the available communication modes between the network access node and the to-be-connected node.

Figure 2A:
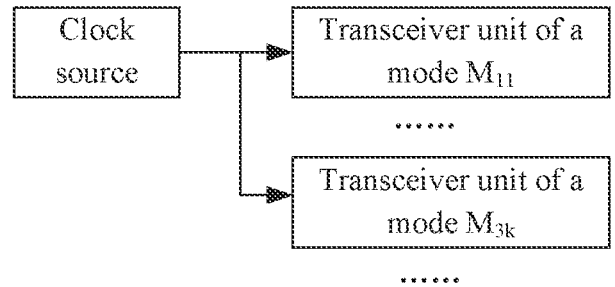
FIG. 2A, FIG. 2B, and FIG. 2C respectively are schematic diagrams of a shared clock system, a non-shared clock system, and a non-shared clock system according to an embodiment of the present disclosure.
Figure 2B:
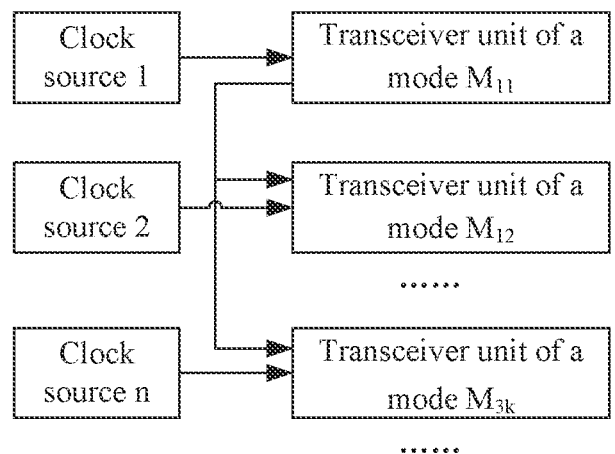
Figure 2C:
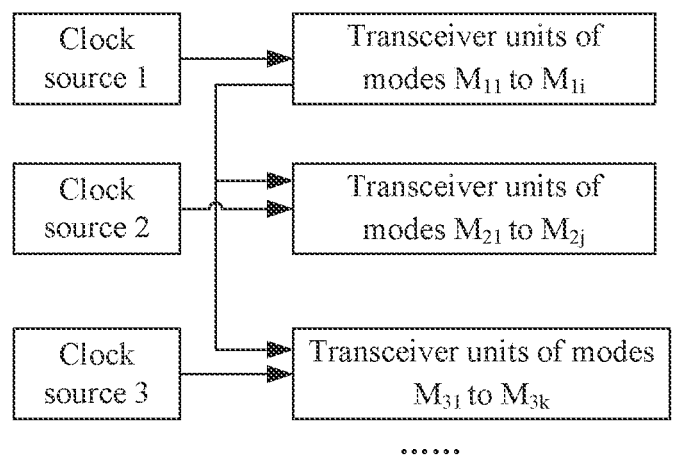

In following embodiments, a transceiver unit (for example, transceiver units of the modes $M_{11}$ to $M_{3k}$) in each node (namely, the collection terminal) may use a shared clock system (as shown in FIG. 2A) or a non-shared clock system (as shown in FIG. 2B). The shared clock system adopts one clock source to output a clock signal and allocates the clock signal to the transceiver unit for synchronization by each transceiver unit through synchronous counting. The non-shared clock system can ensure clock synchronization between various modes in the collection terminal by using an internal synchronization mechanism (such as a synchronization pulse). Each transceiver unit has its own independent clock source, the transceiver unit of the mode $M_{11}$ outputs the synchronization pulse, and the transceiver units of the modes $M_{12}$ to $M_{3k}$ calibrate their own clock sources based on an interval of the synchronization pulse, as shown in FIG. 2B. Certainly, an independent clock source may be set for each of the sets R1 to Rm, as shown in FIG. 2C.

In the step S101, the operation of determining the response information about the available communication modes between the network access node and the to-be-connected node may include: broadcasting, by the network access node, a networking beacon frame in the communication modes in each of the communication mode sets in turn; switching, by the to-be-connected node, one communication mode in each of the communication mode sets in turn based on a first preset cycle to receive the networking beacon frame; and determining, by the to-be-connected node as a specific communication mode in the available communication modes, a communication mode in which the networking beacon frame is received in each of the communication mode sets, and sending response information about the specific communication mode to the network access node. That is, the available communication modes between the network access node and the to-be-connected node are constituted by a specific communication mode in each of the communication mode sets.

The networking beacon frame may include layer information of the network access node. It should be noted that in a following networking discovery stage, when the network access node performs networking discovery, a node at a same layer as the network access node or a node at a higher layer than the network access node does not respond.

The first preset cycle may be greater than a cycle for the network access node to broadcast the networking beacon frame in each mode in each of the communication mode sets.

The networking discovery stage mainly includes following processes executed by the network access node and the to-be-connected node.

Figure 3:
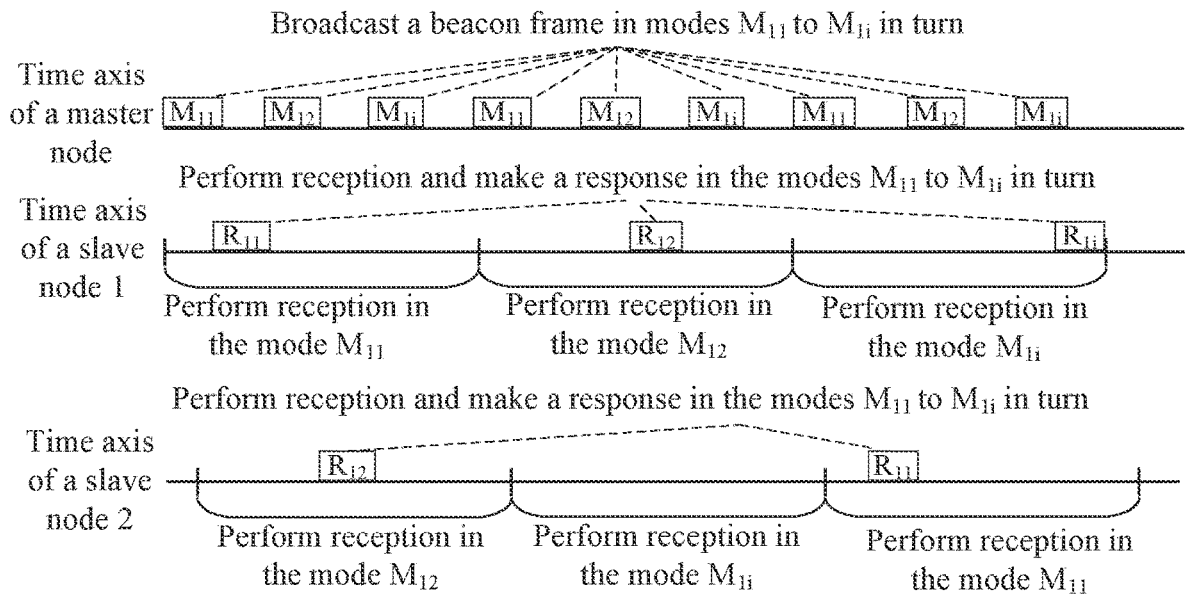
FIG. 3 is a schematic diagram of a networking discovery stage according to an embodiment of the present disclosure.

The set R1 is taken as an example. The network access node (equivalent to a master node) broadcasts the networking beacon frame in the modes $M_{11}$ to $M_{1i}$ in the set R1 in turn, as shown in FIG. 3. The beacon frame may carry layer information of the to-be-connected node. After the networking beacon frame is broadcast in each mode, there may be a time window for waiting for the to-be-connected node (equivalent to a slave node) receiving the information to respond.

In parallel, the network access node broadcasts the networking beacon frame in the modes $M_{21}$-$M_{2j}$ in the set R2 in turn. The beacon frame may also carry the layer information of the to-be-connected node. After the networking beacon frame is broadcast in each mode, there also may be a time window for waiting for the to-be-connected node receiving the information to respond. By analogy, broadcasting is performed independently in the communication modes in the sets R1, R2, and Rm.

The to-be-connected node (namely, the next-layer node of the network access node that broadcasts the networking beacon frame) enables an independent receiving channel in each of the sets R1, R2, and Rm to perform broadcast reception.

The set R1 is taken as an example. The to-be-connected node switches each mode in the set R1 in turn based on the first preset cycle. As shown in FIG. 3, when the to-be-connected node, for example, a node 1, receives the networking beacon frame in a certain mode (for example, the mode $M_{11}$), the node 1 immediately to respond through a carrier sense multiple access (CSMA) mode, and a response frame may be containing an address of the node 1 and the signal attenuation of the mode (for example, the mode $M_{11}$). Accordingly, the to-be-connected node records a specific communication mode (for example, the mode $M_{11}$) and the response information of the node 1. The first preset cycle (namely, a mode switching cycle) of the to-be-connected node may be greater than a cycle of broadcasting the networking beacon frame by the network access node (namely, total traversal time of broadcasting the networking beacon frame in the modes $M_{11}$ to $M_{1i}$ in turn by the network access node) to ensure that there is enough time in each mode to wait for receiving the networking beacon frame broadcast by the access network node in the modes $M_{11}$ to $M_{1i}$ in turn. Therefore, the network access node records specific communication modes (for example, the modes $M_{11}$, $M_{12}$, . . . , and $M_{1i}$) and corresponding response information of the node 1.

In parallel, the to-be-connected node (for example, the node 1) switches the modes in the set R2 in turn. By analogy, the communication modes in each of the sets R1, R2, and Rm are performed independently to wait for reception. Therefore, the network access node records all specific communication mode (namely, available communication modes) and corresponding response information of the node 1.

Therefore, the above networking discovery process may be a process of determining the available communication modes between the network access node and the to-be-connected node and the corresponding response information.

In an embodiment, the to-be-connected node and the network access node can achieve time synchronization by using a clock beacon broadcasting, compensation, calibration, and synchronization mechanism. Accordingly, the networking beacon frame may include the layer information and time scale information of the to-be-connected node.

Figure 4:
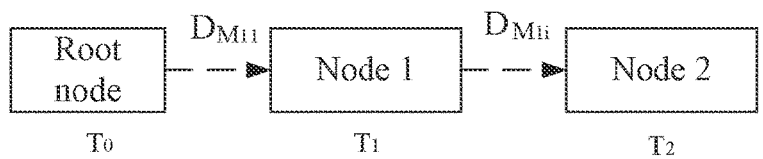
FIG. 4 is a schematic diagram of a clock beacon broadcasting and synchronization compensation calibration mechanism according to an embodiment of the present disclosure.

Specifically, as shown in FIG. 4, the network access node remains relatively constant sending and reception delays for each communication mode. For example, delays from broadcasting of a beacon in the communication modes $M_{11}$ to $M_{1i}$ to reception by a corresponding node are denoted as $D_{M11}$ to $D_{M1i}$.

For example, the root node uses a high-stability clock such as a temperature-compensation crystal oscillator as a benchmark, and the root node broadcasts a data frame with a time scale $T_0$ in the communication mode $M_{11}$ as the network access node. Beacon receiving time $T_1$ of the node 1 is equal to $T_0+D_{M1i}$, and so on. The node 1 broadcasts a data frame with a time scale $T_1$ in the communication mode $M_{1i}$ as the network access node, and beacon receiving time $T_2$ of a node 2 is equal to $T_1+D_{M1i}$. No matter which communication mode among the $M_{11}$ to $M_{1i}$ is adopted, corresponding compensation calibration is carried out to achieve time synchronization between nodes. That is, there is a time synchronization mechanism between physical layer transceiver modules of a plurality of communication modes of the multi-mode communication device.

Step S102: The network access node and the to-be-connected node lock an optimal communication mode in each of the communication mode sets as handshake information between the network access node and the to-be-connected node based on the received response information by using a networking negotiation process.

At most one optimal communication mode is selected from each of the communication mode sets to obtain a plurality of optimal communication modes, and the optimal communication modes are adopted at the same time in the communication process.

For each of the communication mode sets, only one optimal communication mode can be configured at a same time point in the communication process. Therefore, a plurality of optimal communication modes can be selected from a plurality of communication mode sets (which can be realized through timeslot allocation) to perform transmission in a multi-mode manner. For example, one optimal communication mode may be selected from five communication mode sets separately to obtain five optimal communication modes. Alternatively, one optimal communication mode may be selected from the first four communication mode sets of the five communication mode sets (in other words, the optimal communication mode is not selected from a last set) separately to obtain four optimal communication modes. Specifically, for any node combination composed of nodes at any two adjacent layers, at most one optimal communication mode in a same communication mode set can be used for communication and time division multiplexing. Otherwise, two modes in the same set interfere with each other. Therefore, a plurality of modes can be reasonably allocated in terms of time to make full use of the modes for communication, thereby improving the communication quality.

In the step S102, the operation of locking the optimal communication mode in each of the communication mode sets as the handshake information between the network access node and the to-be-connected node may include: selecting, by the network access node based on the response information, the optimal communication mode between the network access node and the to-be-connected node from each of the communication mode sets, and broadcasting a communication mode negotiation frame in the optimal communication mode, where the communication mode negotiation frame includes the optimal communication mode in each of the communication mode sets and the address of the to-be-connected node; and receiving, by the to-be-connected node, the communication mode negotiation frame, locking the optimal communication mode in each of the communication mode sets in the communication mode negotiation frame as the handshake information between the network access node and the to-be-connected node when an actual address of the to-be-connected node matches the address of the to-be-connected node in the communication mode negotiation frame, and feeding back the handshake information to the network access node.

More specifically, the operation of receiving the communication mode negotiation frame by the to-be-connected node may include: switching, by the to-be-connected node, one communication mode in each of the communication mode sets in turn based on a second preset cycle to receive the communication mode negotiation frame. Accordingly, the operation of locking the optimal communication mode in each of the communication mode sets in the communication mode negotiation frame as the handshake information between the network access node and the to-be-connected node may include: when a quantity of times that the communication mode negotiation frame is received in the optimal communication mode meets a preset quantity and a quantity of times that the actual address is matched meets a preset quantity, locking, by the to-be-connected node, the optimal communication mode as the handshake information. In addition, the handshake information may be fed back to the network access node.

A communication mode negotiation stage mainly includes following processes executed by the network access node and the to-be-connected node.

Based on the received response information, the network access node selects a communication mode with optimal channel quality between the network access node and the to-be-connected node from each of the sets R1 to Rm.

The set R1 is taken as an example. The network access node determines the communication mode with the optimal channel quality (for example, a mode $M_{1o}$ shown in FIG. 5) between the network access node and the to-be-connected node based on signal attenuation amounts of the available communication modes in the response information. Moreover, the network access node broadcasts a communication mode negotiation frame in the optimal communication mode $M_{1o}$. The communication mode negotiation frame may include the optimal communication mode $M_{1o}$ and the address of the to-be-connected node (therefore, only a to-be-connected node with the corresponding address can receive the communication mode negotiation frame).

Figure 5:
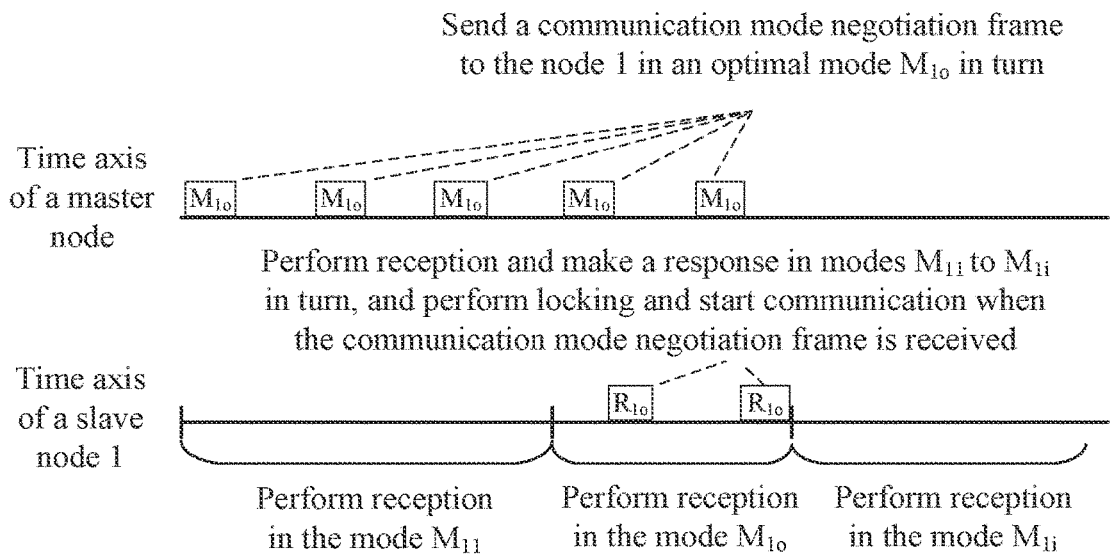
FIG. 5 is a schematic diagram of a communication mode negotiation stage according to an embodiment of the present disclosure.

Accordingly, all to-be-connected nodes switch each mode in the set R1 in turn based on the second preset cycle, and receive the communication mode negotiation frame. The following mode locking step can be performed only when an actual address of a to-be-connected node matches the address of the to-be-connected node in the negotiation frame. Once the communication mode negotiation frame sent by the network access node is received by a to-be-connected node (for example, the node 1) at least one time (for example, twice as shown in FIG. 5), and an actual address of the node 1 matches the address of the to-be-connected node in the communication mode negotiation frame, the node 1 locks to perform a handshake in the communication mode $M_{1o}$, in other words, uses the communication mode $M_{1o}$ as the handshake information between the network access node and the node 1. Therefore, communication mode negotiation is completed between the network access node and the node 1.

By analog, the communication mode negotiation is performed in parallel for sets R2 to Rm.

Therefore, the above networking negotiation process may be a process of determining the handshake information between the network access node and the to-be-connected node (in other words, locking the optimal communication mode in each of the communication mode sets).

The steps S101 and S102 can be performed to determine optimal communication modes in each communication mode set for communication between nodes at any two adjacent layers, and the optimal communication mode can be switched based on an actual channel change. For example, communication quality of each communication mode used can be monitored regularly. If the communication quality is lower than a preset threshold, the communication mode is switched to effectively guarantee the communication quality.

Step S103: The network access node reports routing information between the network access node and the to-be-connected node to the root node based on the handshake information by using a route establishment process, such that the root node updates networking routing information.

In the step S103, the operation of reporting the routing information between the network access node and the to-be-connected node to the root node based on the handshake information may include: creating, by the network access node, the routing information based on the network access node and the to-be-connected node based on the handshake information, and reporting, by the network access node, the routing information to the root node.

Networking route establishment mainly includes following processes executed by the network access node and the to-be-connected node.

The network access node initiates next-layer route establishment based on the handshake information. Therefore, a next-layer to-be-connected node connects to a network, and created routing information between the network access node and the to-be-connected node contains information of an optimal communication mode. The network access node reports the created routing information to the root node, such that the root node updates the networking routing information (in other words, updates a routing information table shown in Table 1).

Therefore, the above route establishment process may be a process of creating the routing information between the network access node and the to-be-connected node.

In an embodiment, the networking method may further include: in response to that the root node updates and sends the networking routing information, receiving and storing, by the network access node and the to-be-connected node, the networking routing information.

Specifically, after updating the networking routing information, the root node also sends, through layer-by-layer broadcasting, the networking routing information to all nodes on a path including the corresponding network access node and the to-be-connected node in a networking architecture. Therefore, the network access node and the to-be-connected node can receive and store the networking routing information, such that they can easily know a node that has been connected to the network and a node that has not been connected to the network (namely, to-be-connected node) at a next layer.

In an embodiment, the networking method may further include: in response to that the root node updates the networking routing information, performing, by the to-be-connected node, a role update operation to update the to-be-connected node to a new network access node; and performing following operations based on whether the new network access node meets a preset termination condition: if the new network access node does not meet the preset termination condition, locking an optimal communication mode, in each of the communication mode sets, between the new network access node and a next-layer to-be-connected node as handshake information by using the networking discovery process and the networking negotiation process, and reporting, by the new network access node, routing information between the new network access node and the next-layer to-be-connected node to the root node based on the handshake information by using the route establishment process, such that the root node updates the networking routing information; or after receiving a feedback that the root node determines that the new network access node meets the preset termination condition, confirming that content about the new network access node in the networking routing information has been updated.

The preset termination condition may include: no response information is received within a first preset time period after the broadcast of networking beacon frame is fed back; all next-layer nodes of the new network access node have all been connected to the network (specifically, it is determined, by comparing all nodes in a transformer region file (namely, the networking architecture) stored on the root node with all connected nodes, that all the nodes in the transformer region file have been connected to the network); or the new network access node is at a highest layer of the networking architecture.

Specifically, after the networking routing information is updated by the root node, it indicates that the to-be-connected node has successfully been connected to the network. At this time, the to-be-connected node switches its own role to the new network access node. Then, the root node determines whether the new network access node meets the preset termination condition. If the new network access node meets the preset termination condition, it indicates that a networking process about the new network access node ends. If the new network access node does not meet the preset termination condition, the new network access node and its next-layer to-be-connected node lock corresponding handshake information by using the networking discovery process and the networking negotiation process, and then routing information between the new network access node and its next-layer to-be-connected node is reported to the root node based on the handshake information by using the route establishment process, such that the root node updates the networking routing information. By analogy, the networking process ends until the preset termination condition is met.

The above embodiments provide description only for one to-be-connected node. Similarly, processes in networking discovery, communication mode negotiation, and networking route establishment stages of another to-be-connected node are similar to the above processes, and are not described herein again. Thus, the entire networking can be established by using the above processes.

For example, in the routing information table, two nodes may have an optimal communication mode in each of the sets R1 to Rm, or may have an optimal communication mode in only one or more sets. The routing information table also contains a statistical value of a communication success rate of the two nodes in the selected mode.

TABLE 1

Routing information table

| Current node Information | | Next-layer node | PCO1 | | |
| --- | --- | --- | --- | --- | --- |
| Sequence number | Target node | | Optimal mode in the set R1 (HPLC) | Optimal mode in the set R2 (narrowband power line communication) | Optimal mode in the set R3 (micropower wireless) |
| 1 | STA4 | STA4 | $M_{13}$ | $M_{21}$ | $M_{31}$ |
| 2 | STA6 | PCO2 | $M_{13}$ | / | / |
| ... | ... | ... | ... | ... | ... |
| n | STA8 | PCO3 | / | / | $M_{32}$ |

PCO represents a proxy master node.

Figure 6:
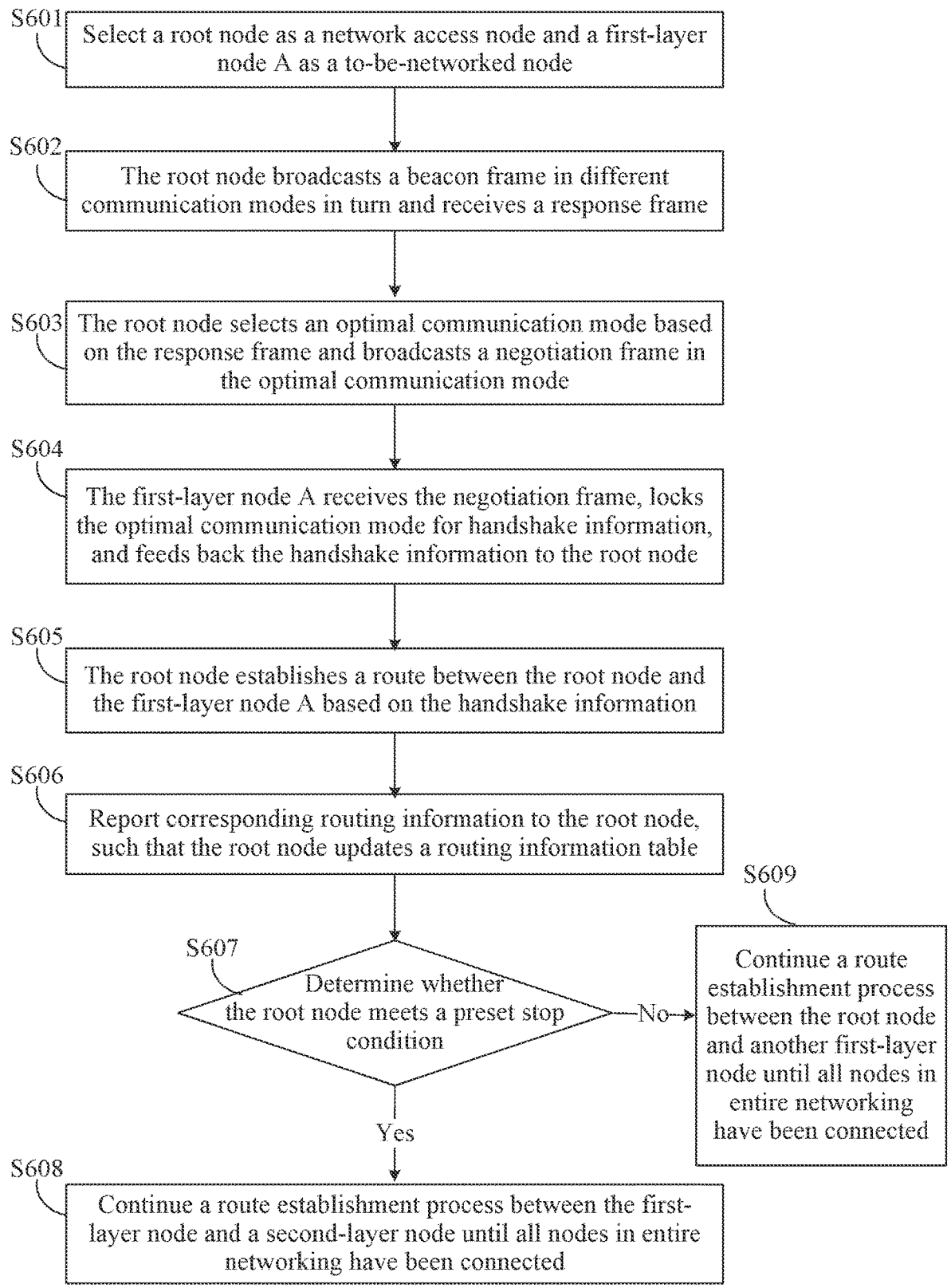
FIG. 6 is a schematic diagram of a networking process according to an embodiment of the present disclosure.

Specifically, the networking process is summarized below, as shown in FIG. 6.

As shown in FIG. 6, the networking process may include following steps S601 to S609.

Step S601: Select the root node as the network access node and a first-layer node A as the to-be-connected node.

Step S602: The root node broadcasts a beacon frame in different communication modes in turn and receives a response frame.

The step S602 is the networking discovery stage. The response frame may include an address of the first-layer node A, an available communication mode between the root node and the first-layer node A, and characteristic parameters representing channel quality of the available communication mode.

Step S603: The root node selects an optimal communication mode based on the response frame and broadcasts a negotiation frame in the optimal communication mode.

Step S604: The first-layer node A receives the negotiation frame, locks the optimal communication mode for handshake information, and feeds back the handshake information to the root node.

The steps S603 and S604 are the communication mode negotiation stage, and the optimal communication mode includes an optimal communication mode in each mode set.

Step S605: The root node establishes a route between the root node and the first-layer node A based on the handshake information.

The handshake information includes optimal communication information.

Step S606: Report corresponding routing information to the root node, such that the root node updates the routing information table.

The steps S605 and S606 are the networking route establishment stage, and the corresponding routing information includes the optimal communication mode in each mode set for communication between the root node and the first-layer node A.

Step S607: Determine whether the root node meets a preset stop condition; and if the root node meets the preset stop condition, perform a step S608; otherwise, perform a step S609.

Step S608: Continue the route establishment process between the first-layer node and a second-layer node until all nodes in the entire networking have been connected.

Step S609: Continue the route establishment process between the root node and another first-layer node until all nodes in the entire networking have been connected.

Information of the entire networking architecture (network relationship between the root node and a node at each layer) is stored on the root node.

Therefore, each node can perform network discovery, communication mode negotiation, and networking route establishment. First, the root node is selected as the network access node for network discovery, to perform network discovery, communication mode negotiation, and networking route establishment for the first-layer node. Then a first-layer connected node is selected as the network access node for network discovery, to perform network discovery, communication mode negotiation, and networking route establishment for the second-layer node, and so on. When a networking termination condition is met (for example, networking time is reached or the CCO of the root node finds that all nodes in a list have been connected to the network), the networking is completed.

Before the networking, an available communication mode between nodes is detected through multi-mode networking discovery, networking negotiation, networking route establishment, and the like, and communication quality is analyzed to determine an optimal communication mode to ensure communication performance after the networking.

An embodiment of the present disclosure provides a networking method for a multi-mode communication device, applied to a to-be-connected node. The networking method includes: sending response information about available communication modes between a network access node and the to-be-connected node to the network access node by using a networking discovery process, where the available communication modes include communication modes in a plurality of communication mode sets, communication modes in each of the communication mode sets are incompatible with each other, and communication modes in different communication mode sets are compatible with each other; the to-be-connected node is a next-layer node of the network access node; and the response information includes an address of the to-be-connected node and characteristic parameters representing channel quality of the communication mode; and in response to that the network access node selects an optimal communication mode between the network access node and the to-be-connected node from each of the communication mode sets based on the response information, locking the optimal communication mode in each of the communication mode sets as handshake information between the network access node and the to-be-connected node by using a networking negotiation process when a preset negotiation result is met, such that the network access node reports routing information between the network access node and the to-be-connected node to a root node based on the handshake information by using a route establishment process, and the root node updates networking routing information, where at most one optimal communication mode is selected from each of the communication mode sets to obtain a plurality of optimal communication modes, and the optimal communication modes are adopted at the same time in a communication process.

Preferably, the sending response information about available communication modes between a network access node and the to-be-connected node to the network access node by using a networking discovery process includes: in response to that the network access node broadcasts a networking beacon frame in the communication modes in each of the communication mode sets in turn, switching one communication mode in each of the communication mode sets in turn based on a first preset cycle to receive the networking beacon frame; and determining, as a specific communication mode in the available communication modes, a communication mode in which the networking beacon frame is received in each of the communication mode sets, and sending response information about the specific communication mode to the network access node. The networking beacon frame includes layer information of the network access node.

Preferably, the to-be-connected node and the network access node achieve time synchronization by using a clock beacon broadcasting, compensation, and calibration mechanism. Correspondingly, the networking beacon frame includes layer information and time scale information of the to-be-connected node.

Preferably, the first preset cycle be greater than a cycle for the network access node to broadcast the networking beacon frame in each mode in each of the communication mode sets.

Preferably, the locking the optimal communication mode in each of the communication mode sets as handshake information between the network access node and the to-be-connected node by using a networking negotiation process when a preset negotiation result is met includes: in response to that the network access node selects the optimal communication mode between the network access node and the to-be-connected node from each of the communication mode sets based on the response information, and broadcasts a communication mode negotiation frame in the optimal communication mode, where the communication mode negotiation frame includes the optimal communication mode in each of the communication mode sets and the address of the to-be-connected node, performing following operations: receiving the communication mode negotiation frame, locking the optimal communication mode in each of the communication mode sets in the communication mode negotiation frame as the handshake information between the network access node and the to-be-connected node when an actual address of the to-be-connected node matches the address of the to-be-connected node in the communication mode negotiation frame, and feeding back the handshake information to the network access node.

Preferably, the receiving the communication mode negotiation frame includes: switching one communication mode in each of the communication mode sets in turn based on a second preset cycle to receive the communication mode negotiation frame. Accordingly, the locking the optimal communication mode in each of the communication mode sets in the communication mode negotiation frame as the handshake information between the network access node and the to-be-connected node includes: when a quantity of times that the communication mode negotiation frame is received in the optimal communication mode meets a preset quantity and a quantity of times that the actual address is matched meets a preset quantity, locking the optimal communication mode as the handshake information.

Preferably, the networking method further includes: in response to that the root node updates and sends the networking routing information, receiving and storing the networking routing information, and performing a role update operation to update the to-be-connected node to a new network access node.

An embodiment of the present disclosure provides a networking method for a multi-mode communication device, applied to a network access node. The networking method includes: receiving response information about available communication modes between the network access node and a to-be-connected node by using a networking discovery process, where the available communication modes include communication modes in a plurality of communication mode sets, communication modes in each of the communication mode sets are incompatible with each other, and communication modes in different communication mode sets are compatible with each other; the to-be-connected node is a next-layer node of the network access node; and the response information includes an address of the to-be-connected node and characteristic parameters representing channel quality of the communication mode; selecting an optimal communication mode between the network access node and the to-be-connected node from each of the communication mode sets based on the response information by using a networking negotiation process, such that the to-be-connected node locks the optimal communication mode in each of the communication mode sets as handshake information between the network access node and the to-be-connected node when a preset negotiation result is met, where at most one optimal communication mode is selected from each of the communication mode sets to obtain a plurality of optimal communication modes, and the optimal communication modes are adopted at the same time in a communication process; and reporting routing information between the network access node and the to-be-connected node to a root node based on the handshake information by using a route establishment process, such that the root node updates networking routing information.

Preferably, the receiving response information about available communication modes between the network access node and a to-be-connected node by using a networking discovery process includes: broadcasting a networking beacon frame in the communication nodes in each of the communication mode sets in turn; and in response to that the to-be-connected node determines, as a specific communication mode in the available communication modes, a communication mode in which the networking beacon frame is received in each of the communication mode sets, receiving response information about the specific communication mode.

Preferably, the networking beacon frame includes layer information of the network access node.

Preferably, the to-be-connected node and the network access node achieve time synchronization by using a clock beacon broadcasting, compensation, and calibration mechanism. Correspondingly, the networking beacon frame includes layer information and time scale information of the to-be-connected node.

Preferably, the selecting an optimal communication mode between the network access node and the to-be-connected node from each of the communication mode sets based on the response information by using a networking negotiation process, such that the to-be-connected node locks the optimal communication mode in each of the communication mode sets as handshake information between the network access node and the to-be-connected node when a preset negotiation result is met includes: selecting the optimal communication mode between the network access node and the to-be-connected node from each of the communication mode sets based on the response information; broadcasting a communication mode negotiation frame in the optimal communication mode, where the communication mode negotiation frame includes the optimal communication mode in each of the communication mode sets and the address of the to-be-connected node, such that the to-be-connected node receives the communication mode negotiation frame, and locks the optimal communication mode in each of the communication mode sets in the communication mode negotiation frame as the handshake information between the network access node and the to-be-connected node when an actual address of the to-be-connected node matches the address of the to-be-connected node in the communication mode negotiation frame; and receiving the handshake information.

Preferably, the networking method further includes: in response to that the to-be-connected node is updated to the new network access node, performing following operations based on whether the new network access node meets a preset termination condition: if the new network access node does not meet the preset termination condition, locking an optimal communication mode, in each of the communication mode sets, between the new network access node and a next-layer to-be-connected node as handshake information by using the networking discovery process and the networking negotiation process, and reporting, by the new network access node, routing information between the new network access node and the next-layer to-be-connected node to the root node based on the handshake information by using the route establishment process, such that the root node updates the networking routing information; or after receiving a feedback that the root node determines that the new network access node meets the preset termination condition, confirming that content about the new network access node in the networking routing information has been updated.

Preferably, the preset termination condition includes: no response information is received within a first preset time period after the new network access node broadcasts a networking beacon frame; all next-layer nodes of the new network access node have all been connected to the network; or the new network access node is at a highest layer of the networking architecture.

Preferably, the networking method further includes: in response to that the root node updates and sends the networking routing information, receiving and storing the networking routing information.

Preferably, the reporting routing information between the network access node and the to-be-connected node to a root node based on the handshake information by using a route establishment process includes: creating the routing information based on the network access node and the to-be-connected node based on the handshake information, and reporting the routing information to the root node.

An embodiment of the present disclosure provides a networking method for a multi-mode communication device, applied to a root node. The networking method includes: updating networking routing information based on routing information between a network access node and a to-be-connected node that is reported according to the networking method for a multi-mode communication device.

For specific details and benefits of the networking method for a multi-mode communication device, which is applied to a single side (the to-be-connected node, the network access node, or the root node), in the embodiments of the above disclosure, reference may be made to the above description of the networking method for a multi-mode communication device. Details are not described herein again.

In summary, the present disclosure creatively adds mutually incompatible communication modes to a same communication mode set, and determines an optimal communication mode in each communication mode set that can be used for communication between nodes at any two adjacent layers by using a networking discovery process, a networking negotiation process, and a route establishment process. In addition, at most one optimal communication mode in the same communication mode set can be configured at a same time point, such that a plurality of mutually compatible optimal communication modes between nodes at any two adjacent layers can be determined, thus ensuring high-quality communication performance after networking. Therefore, the present disclosure can make full use of cooperation between a plurality of communication modes to achieve hybrid networking communication and maximally use channel resources.

In the embodiments of the present disclosure, the multi-mode communication module may be one or more processors or chips that each have a communication interface, can realize a communication protocol, and may further include a memory, a related interface and system transmission bus, and the like if necessary. The processor or chip executes program-related code to realize a corresponding function. The transceiver module may be one or more processors or chips that each have a communication interface, can realize a communication protocol, and may further include a memory, a related interface and system transmission bus, and the like if necessary. The processor or chip executes program-related code to realize a corresponding function. The transceiver unit may be one or more processors or chips that each have a communication interface, can realize a communication protocol, and may further include a memory, a related interface and system transmission bus, and the like if necessary. The processor or chip executes program-related code to realize a corresponding function.

An embodiment of the present disclosure provides a communication method. The communication method may include: updating networking routing information according to the networking method for a multi-mode communication device; and based on routing information between a first node and a second node that are located at each two adjacent layers and on a path from a start communication node to a target communication node in the networking routing information, performing communication between the start communication node and the target communication node.

The networking routing information is updated according to the networking method for a multi-mode communication device. Therefore, mutually incompatible communication modes can be added to a same communication mode set, and then an optimal communication mode in each communication mode set that can be used for communication between nodes at any two adjacent layers is determined by using a networking discovery process and a networking negotiation process. In addition, at most one optimal communication mode in the same communication mode set can be configured at a same time point, such that a plurality of mutually compatible optimal communication modes between nodes at any two adjacent layers can be determined, thus ensuring high-quality communication performance after networking. Therefore, the present disclosure can make full use of cooperation between a plurality of communication modes to achieve hybrid networking communication and maximally use channel resources.

The start communication node and the target communication node may be any two nodes in a networking architecture, while the first node and the second node are nodes that are located at any upper and lower layers and on the communication path between the start communication node and the target communication node. The start communication node, the target communication node, the first node, and the second node each may be a multi-mode communication device. Certainly, the start communication node may also be the first node, and the target communication node may also be the second node, in other words, the communication is performed only between the start communication node and the target communication node.

Figure 10:
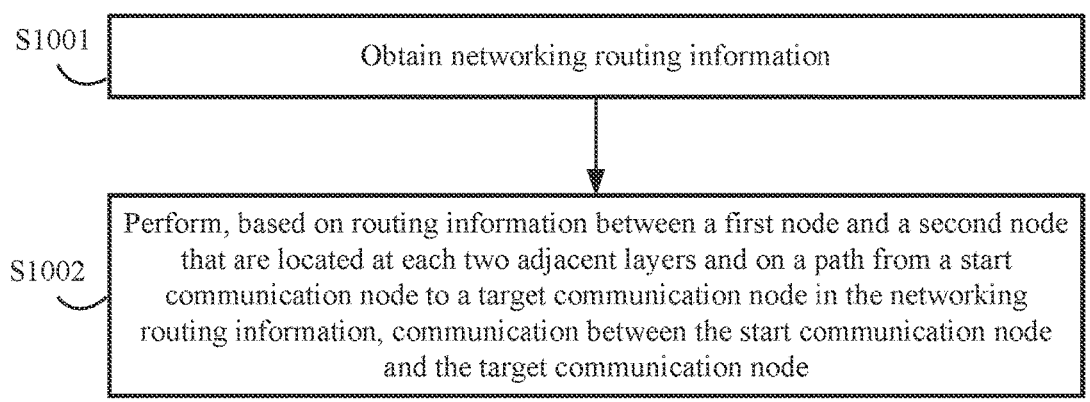
FIG. 10 is a flowchart of a communication method for a multi-mode communication device according to an embodiment of the present disclosure.

In addition to being updated according to the networking method for a multi-mode communication device, in another embodiment, the networking routing information can be determined in advance and stored on a root node. The networking routing information may be obtained by a route obtaining apparatus from the root node. Specifically, an embodiment of the present disclosure provides a communication method, as shown in FIG. 10. The communication method may include: a step S1001, namely, obtaining networking routing information, where the networking routing information includes routing information between a first node and a second node that are located at each two adjacent layers and on a path from a start communication node to a target communication node, the routing information between the first node and the second node includes an optimal communication mode, in each of a plurality of communication mode sets, between the first node and the second node, communication modes in each of the communication mode sets are not compatible with each other, and communication modes in different communication mode sets are compatible with each other; and a step S1002, namely, performing communication between the start communication node and the target communication node based on the routing information between the first node and the second node that are located at each two adjacent layers and on the path from the start communication node to the target communication node in the networking routing information.

The networking routing information includes the routing information between the first node and the second node that are located at each two adjacent layers and on the path from the start communication node to the target communication node, the routing information between the first node and the second node includes the optimal communication mode in each of the communication mode sets between the first node and the second node, the communication modes in each of the communication mode sets are not compatible with each other, and the communication modes in the different communication mode sets are compatible with each other.

Based on the networking routing information updated according to the above networking method, it is known that the routing information between the first node and the second node includes the optimal communication mode in each of the communication mode sets. Since there are conflicts and interference between optimal communication modes in a same communication mode set, a timeslot allocation method can be used for synchronization. However, optimal communication modes in different sets do not affect each other, so they can support concurrent or time-sharing communication.

In an embodiment, the performing communication between the start communication node and the target communication node may include: performing communication between the first node and the second node based on routing information between the first node and the second node that are located at any two adjacent layers.

The following only describes a communication process between the first node and the second node that are located at two adjacent layers, and a communication process at other two adjacent layers is similar.

The performing communication between the first node and the second node based on routing information between the first node and the second node that are located at any two adjacent layers may include: allocating timeslots to the optimal communication mode in each of the communication mode sets in the routing information, such that the at most one optimal communication mode is selected from each of the communication mode sets to obtain the optimal communication modes, and the optimal communication modes are adopted at the same time in the communication process; and performing the communication between the first node and the second node based on the optimal communication mode to which the timeslots are allocated in each of the communication mode sets.

Figure 7:
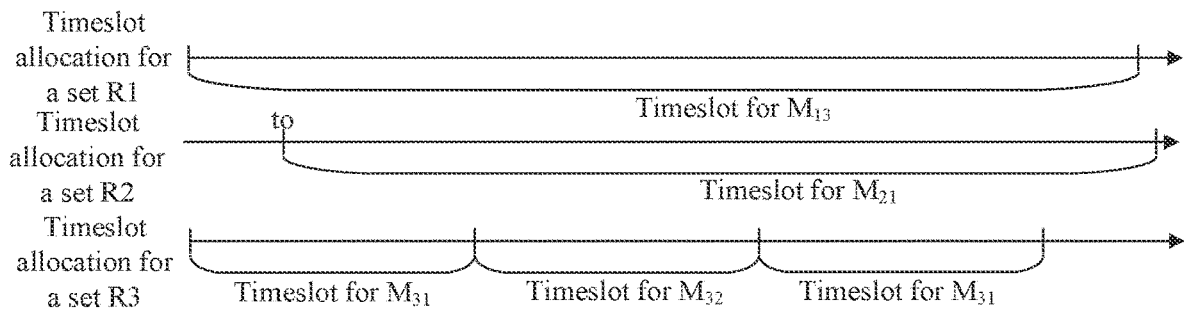
FIG. 7 is a schematic diagram of timeslot allocation according to an embodiment of present disclosure.

Specifically, timeslot allocation is completely independent for sets R1, R2, and R3, as shown in FIG. 7. For example, optimal communication modes in different sets do not affect each other, and support concurrent or time-sharing communication. For optimal communication mode in the set R3, the time-sharing communication is performed through timeslot allocation to ensure that at most one optimal communication mode is adopted at a same time point in the set R3. Since one set has same preset communication modes, competitive communication in a CMSA manner can be adopted. Actually, a root node may perform timeslot allocation based on a network scale and the optimal communication mode. A timeslot allocation result is broadcast by the root node to a whole network by using a beacon. For example, the root node sends next-cycle timeslot allocation information in a current cycle by means of broadcasting or in a TDMA or CSMA manner.

Based on existing multi-mode communication, an optimal communication mode is usually selected from a variety of communication modes based on a service type or only based on load and other parameters of a communication network to perform communication. However, the above communication mode cannot provide a well-matched communication mode for each application scenario in real time by considering both a service demand and a network capability.

In an embodiment, more specifically, the step of performing the communication between the first node and the second node based on the optimal communication mode to which the timeslots are allocated in each of the communication mode sets may include: selecting a specific mode selection strategy from a plurality of mode selection strategies based on the service type; determining, based on the optimal communication mode to which the timeslots are allocated in each of the communication mode sets, a plurality of optimal communication modes allocated at a current time point; taking statistics on channel occupancy rates and communication success rates of the optimal communication modes in second preset time before the current time point; selecting a specific communication mode from the optimal communication modes based on the specific mode selection strategy and the channel occupancy rates and communication success rates that are obtained through statistics; and performing the communication between the first node and the second node in the specific communication mode at the current time point.

The mode selection strategies include a maximum efficiency strategy, a maximum reliability strategy, and a load balancing strategy.

Specifically, for example, the first node sends information to the second node. First, a transmit data frame carries an identifier of a service type. The first node selects a mode selection strategy based on the identifier of the service type. When the identifier of the service type indicates that the service type has a high real-time requirement for data, the maximum efficiency strategy can be adopted. When the identifier of the service type indicates that the service type is data communication with a high reliability requirement such as switching on/off or fee control, the maximum reliability strategy can be adopted. When the identifier of the service type indicates that the service type is characterized by a large data volume and heavy communication traffic, the load balancing strategy can be adopted.

Then, the first node can determine, based on the optimal communication mode to which the timeslots are allocated in each of the communication mode sets, a plurality of optimal communication modes allocated at a current time point. After that, the first node selects a specific communication mode from the optimal communication modes based on the selected specific mode selection strategy. Finally, the first node sends a data frame to the second node in the selected specific communication mode at the current time point. Therefore, an appropriate communication mode is selected from optimal communication modes in different sets based on different strategies for communication, which greatly improves efficiency and reliability of data transmission.

In an embodiment, when the specific communication mode is the maximum efficiency strategy, the selecting a specific communication mode from the optimal communication modes includes: determining a communication bandwidth of each of the optimal communication modes in the second preset time based on the channel occupancy rates and communication success rates that are obtained through statistics; and selecting, based on the communication bandwidth of each of the optimal communication modes in the second preset time, the specific communication mode that meets a target communication bandwidth required for to-be-transmitted data from the optimal communication modes.

A communication bandwidth of the specific communication mode may be greater than that of any other optimal communication mode among the optimal communication modes.

Specifically, the selecting the specific communication mode that meets a target communication bandwidth required for to-be-transmitted data from the optimal communication modes may include: ranking the optimal communication modes in descending order based on the communication bandwidth; and performing following operations based on communication bandwidths of the ranked optimal communication modes and the target communication bandwidth: when a communication bandwidth of a first-ranked optimal communication mode is greater than or equal to the target communication bandwidth, determining the first-ranked optimal communication mode as the specific communication mode; or when a total communication bandwidth of the first L optimal communication modes is less than the target communication bandwidth and a total communication bandwidth of the first L+1 optimal communication modes is greater than or equal to the target communication bandwidth, determining the first L+1 optimal communication modes as the specific communication mode, where L is a positive integer.

Specifically, for example, the communication is performed between the first node and the second node at a time point t. A plurality of optimal communication modes allocated at the current time point t can be determined based on the optimal communication mode to which the timeslots are allocated in each of the communication mode sets. First, a process of obtaining a channel occupancy rate, a channel conflict probability, and a communication success rate of each of the optimal communication modes in a time period $T_{total}$ before the time point t is described.

For example, the second node enables a receiving channel in the optimal communication modes, takes statistics on a total quantity $Num(F_{total})$ of data frames received, a total quantity $Num(F_{collision})$ of conflicting data frames, and total time $\Sigma T_{busy}$ during which the channel is busy in the time period $T_{total}$ for each of the optimal communication modes, and calculates the channel occupancy rate $TD_{Duty}$, the channel conflict probability $r_{collision}$, and the communication success rate $r_{success}$ of each of the optimal communication modes in the time period $T_{total}$. Based on the above three parameters obtained through statistics, an available state of each optimal communication mode can be determined, namely, $$\begin{cases} TD_{Duty} = \dfrac{\sum T_{busy}}{T_{total}} \\ r_{collision} = \dfrac{Num(F_{collision})}{Num(F_{total})} \\ r_{success} = (1 - r_{collision}) \end{cases}$$

Then, a theoretical communication rate $R_{theory}$ of each optimal communication mode in sets R1 to Rm is estimated. The theoretical communication rate is estimated based on a physical layer bandwidth $R_{PHY}$, application layer load efficiency $\eta_{APP}$, CSMA slot efficiency $\eta_{CSMA}$, the communication success rate $r_{success}$, and a layer $H_{layer}$:

$$R_{theory} = R_{PHY} \times \dfrac{\eta_{APP} \times \eta_{CSMA} \times r_{success}}{H_{Layer}}.$$

Next, based on the theoretical communication rate $R_{theory}$ of each optimal communication mode in the sets R1 to Rm, a communication bandwidth $R_{available}$ of each optimal communication mode in the time period $T_{total}$ is calculated:

$$R_{available} = R_{theory} \times (1 - TD_{Duty})$$

Certainly, the communication bandwidth $R_{available}$ of each optimal communication mode may alternatively be obtained in advance and used directly as an input parameter.

Finally, based on the communication bandwidth $R_{available}$ of each optimal communication mode, a specific communication mode that meets a target communication bandwidth $R_{require}$ required for to-be-transmitted data is selected from the optimal communication modes at the current time point. The specific communication mode may be at least one mode, but a communication bandwidth of the at least one communication mode is greater than that of any other mode among the optimal communication modes.

For example, the optimal communication modes at the current time point are ranked in descending order based on the communication bandwidth. If the communication bandwidth of the first-ranked optimal communication mode (in other words, the optimal communication mode with a largest communication bandwidth) is greater than or equal to the target communication bandwidth, the first-ranked optimal communication mode is selected as the specific communication mode. If a total communication bandwidth of the first one optimal communication mode is less than the target communication bandwidth and a total communication bandwidth of the first two optimal communication modes is greater than or equal to the target communication bandwidth, the first two communication modes are selected as the specific communication mode. During the communication, transmit data can be allocated to the two communication modes based on a bandwidth ratio before being sent, to improve communication efficiency.

In an embodiment, when the specific communication mode is the maximum reliability strategy, the selecting a specific communication mode from the optimal communication modes may include: determining a communication reliability parameter of each of the optimal communication modes in the second preset time based on the communication success rates that are obtained through statistics; and selecting the specific communication mode from the optimal communication modes based on a reliability grade required for to-be-transmitted data and the communication reliability parameter of each of the optimal communication modes in the second preset time.

Specifically, the selecting the specific communication mode from the optimal communication modes based on a reliability grade required for the to-be-transmitted data and the communication reliability parameter of each of the optimal communication modes in the second preset time may include: ranking the optimal communication modes in descending order based on the communication reliability parameter; and performing following operations based on communication reliability parameters of the ranked optimal communication modes and the reliability grade required for the to-be-transmitted data: when the reliability grade required for the to-be-transmitted data is highest, determining the first M optimal communication modes as the specific communication mode, where M is a positive integer; when the reliability grade required for the to-be-transmitted data is moderate, randomly determining one of the first S optimal communication modes as the specific communication mode, where S is a positive integer greater than 1; or when the reliability grade required for the to-be-transmitted data is lowest, randomly determining one of the optimal communication modes as the specific communication mode.

First, a communication reliability parameter $Q_{reliability}$ of each optimal communication mode in the sets R1 to Rm in the time period $T_{total}$ is estimated. Specifically, a quantity $N_{retry}$ of retransmissions and following formulas are determined based on a maximum delay $T_{max\_delay}$ required for data communication and a minimum cycle send of data sending, and the communication reliability parameter $Q_{reliability}$ of each optimal communication mode in the time period $T_{total}$ is calculated based on the communication success rate $r_{success}$ the quantity $N_{retry}$ of retransmissions, and the following formulas:

$$\begin{cases} Q_{reliability} = 1 - (1 - r_{success})^{N_{retry}} \\ N_{retry} \times T_{send} \le T_{maxdelay} \end{cases}$$

Finally, the specific communication mode is selected from the optimal communication modes at the current time point t based on the reliability grade required for the to-be-transmitted data and the communication reliability parameter of each optimal communication mode in the time period $T_{total}$. The specific communication mode may be at least one mode.

For example, the optimal communication modes at the current time point t are ranked in descending order based on the communication reliability parameter. If the reliability grade is highest, the first two optimal communication modes are determined as the specific communication mode. If the reliability grade is moderate, one of the first five optimal communication modes is randomly selected as the specific communication mode. If the reliability grade is lowest, one of the optimal communication modes is randomly selected as the specific communication mode; or the maximum reliability strategy is not selected, but the specific communication mode is selected in combination with the maximum efficiency strategy or the load balancing strategy for communication.

In an embodiment, when the specific communication mode is the load balancing strategy, the selecting a specific communication mode from the optimal communication modes may include: determining a communication bandwidth and a channel occupancy rate of each of the optimal communication modes in the second preset time based on the channel occupancy rates and communication success rates that are obtained through statistics; and selecting, based on the communication bandwidth and the channel occupancy rate of each of the optimal communication modes in the second preset time, the specific communication mode that meets a target communication bandwidth required for to-be-transmitted data from the optimal communication modes.

A channel occupancy rate of the specific communication mode may be greater than that of any other optimal communication mode among the optimal communication modes.

Specifically, the selecting the specific communication mode that meets a target communication bandwidth required for to-be-transmitted data from the optimal communication modes may include: ranking the optimal communication modes in ascending order based on the channel occupancy rate; and when a total communication bandwidth of the first T optimal communication modes is greater than or equal to the target communication bandwidth, determining the first T optimal communication modes as the specific communication mode, where T is a positive integer.

First, the communication bandwidth $R_{available}$ and the channel occupancy rate $TD_{Duty}$ of each optimal communication mode in the sets R1 to Rm in the time period $T_{total}$ are determined (for a specific process of determining the communication bandwidth, reference may be made to the relevant content in the above maximum efficiency strategy).

Next, based on the target communication bandwidth required for the to-be-transmitted data, as well as the communication bandwidth $R_{available}$ and the channel occupancy rate $TD_{Duty}$ of each optimal communication mode in the time period $T_{total}$, the specific communication mode that meets the target communication bandwidth required for the to-be-transmitted data is selected from the optimal communication modes at the current time point t. The specific communication mode may be at least one mode, but a channel occupancy rate of the at least one communication mode is greater than that of any other mode among the optimal communication modes.

For example, the optimal communication modes at the current time point t are ranked in ascending order based on the channel occupancy rate. If a communication bandwidth of a first-ranked optimal communication mode (in other words, an optimal communication mode with a minimum channel occupancy rate) is greater than or equal to the target communication bandwidth, the first-ranked optimal communication mode is selected as the specific communication mode. If a total communication bandwidth of the first two optimal communication modes is greater than or equal to the target communication bandwidth, the first two communication modes are selected as the specific communication mode to improve communication efficiency and achieve load balancing.

Certainly, another strategy may also be set. A mode with a low energy consumption may be selected for sending to reduce a communication energy consumption in a battery-powered scenario.

In an embodiment, if the first node simultaneously sends the data frame in different modes, a dynamic power consumption generated by the simultaneous sending is estimated. Once the dynamic power consumption exceeds a limit, the modes are staggered in terms of time to meet a power consumption requirement, so as to achieve power consumption combination control of different sending modes.

The performing the communication between the first node and the second node based on the optimal communication mode to which the timeslots are allocated in each of the communication mode sets may include: performing the communication between the first node and the second node based on the optimal communication mode to which the timeslots are allocated in each of the communication mode sets and a power consumption control strategy (or based on routing information between the first node and the second node that are located at any two adjacent layers and the power consumption control strategy).

More specifically, the performing the communication between the first node and the second node based on the optimal communication mode to which the timeslots are allocated in each of the communication mode sets and a power consumption control strategy may include: when a total power consumption of an allocated first optimal communication mode group that is performing communication and an allocated second optimal communication mode group that starts to perform communication at the current time point exceeds a power consumption threshold, delaying start time of the second optimal communication mode group to a first time point; determining a total power consumption of an allocated third optimal communication mode group that is performing communication and an allocated fourth optimal communication mode group that starts to perform communication at the first time point; and when the total power consumption of the allocated third optimal communication mode group that is performing the communication and the allocated fourth optimal communication mode group that starts to perform the communication at the first time point is less than or equal to the power consumption threshold, performing, from the current time point to the first time point, the communication between the first node and the second node by using the first optimal communication mode group to which timeslots are allocated.

The fourth optimal communication mode group may include at least the second optimal communication mode group. In this embodiment of the present disclosure, a mode group is a set of a plurality of modes used for sending at the same time. A fourth mode group performs communication when start time of a second mode group is delayed to the first time point. Therefore, the fourth mode group includes the second mode group, and may also superpose a new mode or mode group formed for a newly added to-be-transmitted data frame.

A mode set being used for sending at a time point t is denoted as Q, where mode i∈Q, and, $P_i(t)$ is a dynamic power consumption when the mode i is used for sending at the time point t; and a mode set to be used for sending at the time point t is denoted as G, where mode j∈G, and $P_j(t)$ is a dynamic power consumption when the mode j is used for sending at the time point t. $P_{tot}(t)$ represents a total dynamic power consumption for sending, which can be calculated according to a following formula:

$$P_{tot}(t) = \sum_{i \in Q} P_i(t) + \sum_{j \in G} P_j(t)$$

Once $P_{tot}(t)$ exceeds the power consumption threshold (in other words, a dynamic power consumption limit $P_{max}$), a mode in the mode set G to be used for sending is delayed by Δt in terms of time to ensure that a total power consumption at a time point t+Δt meets a requirement for the power consumption limit. Specifically, start sending time of the mode in the mode set G can be staggered from end time of a communication mode that ends first (in other words, ends earliest) in the mode set Q, and whether the total power consumption at the time point t+Δt meets the requirement for the power consumption limit can be determined. If the total power consumption at the time point t+Δt meets the requirement for the power consumption limit, the corresponding Δt is determined. If the total power consumption at the time point t+Δt does not meet the requirement for the power consumption limit, the start sending time of the mode in the mode set G is staggered from end time of a communication mode that ends second earliest in the mode set Q, and whether the power consumption at the time point t+Δt meets the requirement for the power consumption limit is determined, and so on, until the corresponding Δt is determined.

A mode set being used for sending at the time point t+Δt is denoted as Q', where mode i'∈Q', and $P_{i'}(t+\Delta t)$ is a dynamic power consumption when the mode i' is used for sending at the time point t+Δt; and a mode set to be used for sending at the time point t+Δt is denoted as G', where mode j'∈Q', and $P_{j'}(t+\Delta t)$ is a dynamic power consumption when the mode j' is used for sending at the time point (t+Δt). $P_{tot}(t+\Delta t)$ represents a total dynamic power consumption for sending (namely, a total power consumption at the time point t+Δt), which can be determined according to a following formula:

$$P_{tot}(t + \Delta t) = \sum_{i' \in Q'} P_{i'}(t + \Delta t) + \sum_{j' \in G'} P_{j'}(t + \Delta t)$$

Figure 8A:
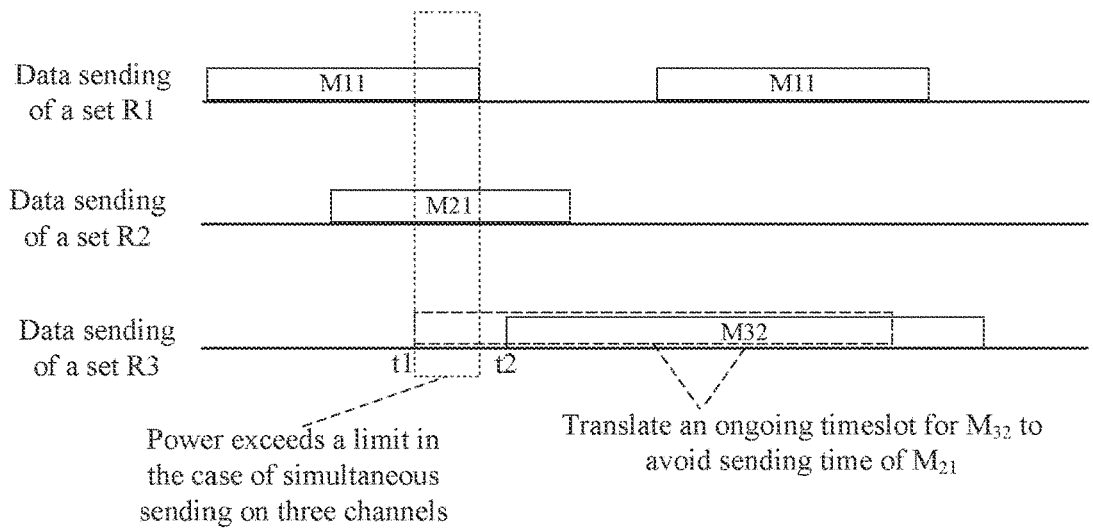
FIG. 8A and FIG. 8B are schematic diagrams of a power consumption control strategy according to an embodiment of the present disclosure.

As shown in FIG. 8A, if a sum of power consumptions of modes $M_{11}$ and $M_{21}$ that are being used for sending and a power consumption of a mode $M_{32}$ to be used for sending at a time point t1 is greater than the power consumption threshold, the mode $M_{32}$ is delayed to a time point t2 (in other words, a time point after the mode $M_{11}$ ends). If a sum of a power consumption of the mode $M_{21}$ being used for sending and a power consumption of the mode $M_{32}$ to be used for sending at the time point t2 is less than or equal to the power consumption threshold, the modes $M_{11}$ and $M_{21}$ to which timeslots are separately allocated are used to send data from the time point t1 to the time point t2.

Figure 8B:
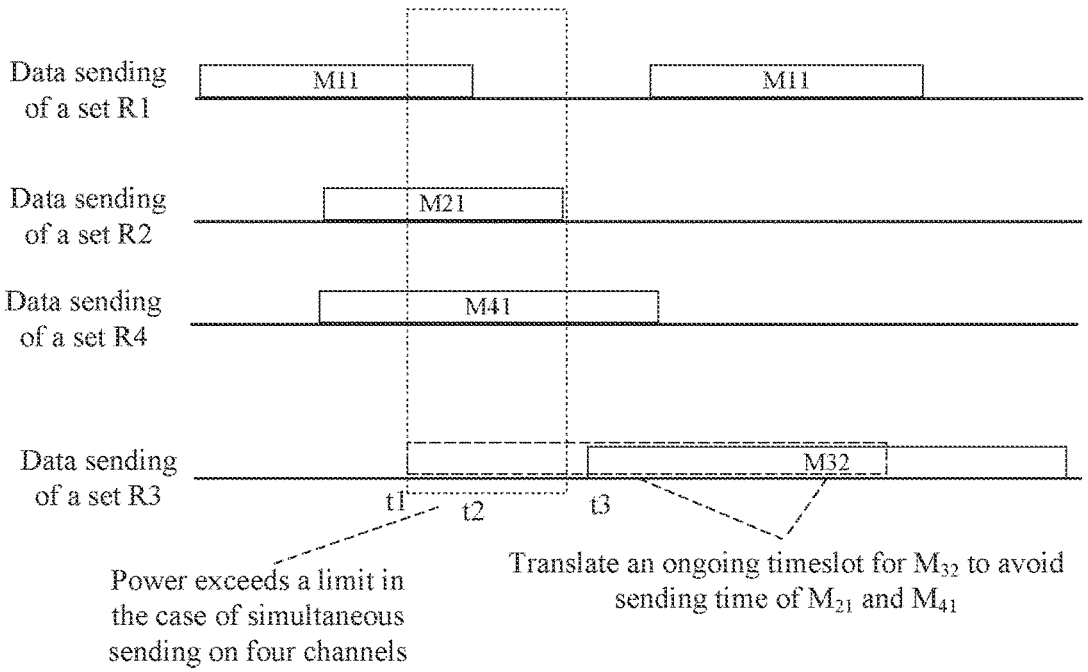

As shown in FIG. 8B, if a sum of power consumptions of modes $M_{11}$, $M_{21}$, and $M_{41}$ that are being used for sending and the power consumption of the mode $M_{32}$ to be used for sending at the time point t1 is greater than the power consumption threshold, the mode $M_{32}$ is delayed to the time point t2 (in other words, the time point after the mode $M_{11}$ ends). However, if a sum of power consumptions of the modes $M_{21}$ and $M_{41}$ that are being used for sending and a power consumption of the mode $M_{32}$ to be used for sending at the time point t2 is still greater than the power consumption threshold, the mode $M_{32}$ is delayed to a time point t3 (in other words, a time point after the mode $M_{21}$ ends). If a sum of a power consumption of the mode $M_{41}$ being used for sending and a power consumption of the mode $M_{32}$ to be used for sending at the time point t3 is less than or equal to the power consumption threshold, the modes $M_{11}$, $M_{21}$, and $M_{41}$ to which timeslots are separately allocated are used to send data from the time point t1 to the time point t3.

This embodiment can greatly improve communication performance and system reliability by using extended functions such as dynamic power consumption control, thus improving a capability of adapting to an external power consumption limitation scenario.

In an embodiment, the communication method may further include: when the first node or the second node receives a data frame group, performing following operations: filtering, in the data frame group, a data frame duplicate with historical data; and/or combining data frame groups under the optimal communication modes to form a complete data frame.

Figure 9A:
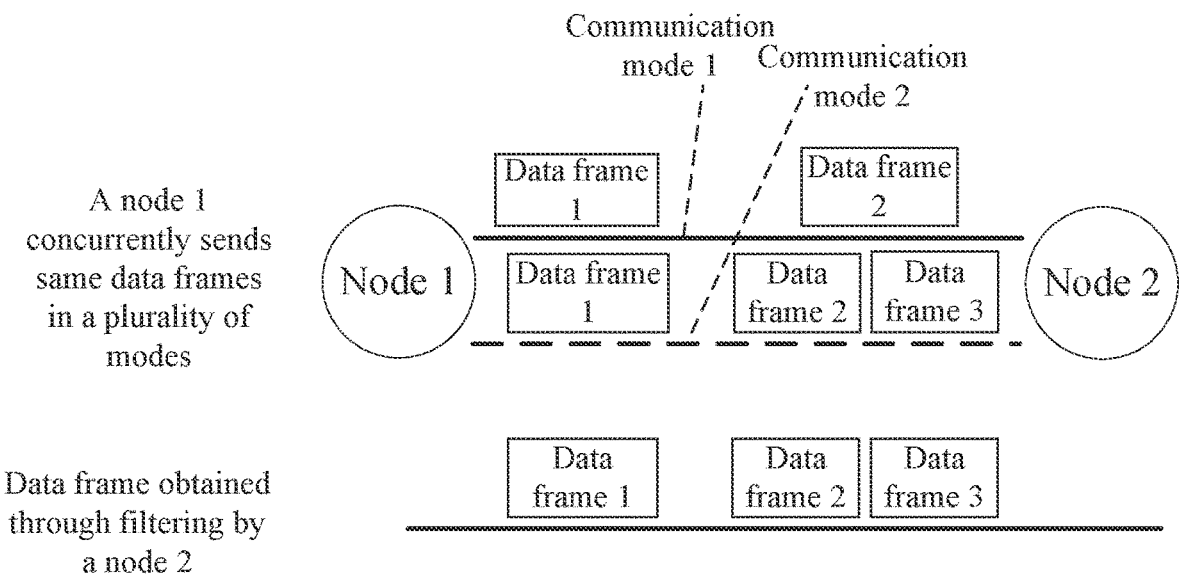
FIG. 9A is a schematic diagram of data filtering according to an embodiment of the present disclosure.

For example, the first node sends a data frame to the second node. The first node sends data frame groups in different modes. At this time, the second node receives the data frame groups sent in the different modes, records a sequence number, a source address, a destination address, and other channel status information of the data frame, and compares the different data frame groups with a historical record to filter duplicate data frames (the duplicate data frames have identical sequence numbers, source addresses, and destination addresses). As shown in FIG. 9A, a node 1 uses a mode 1 to send data frames 1 and 2, and uses a mode 2 to send data frames 1, 2, and 3; and a node 2 receives data and filters it to obtain a complete data frame sequence, namely, the data frames 1 to 3.

Figure 9B:
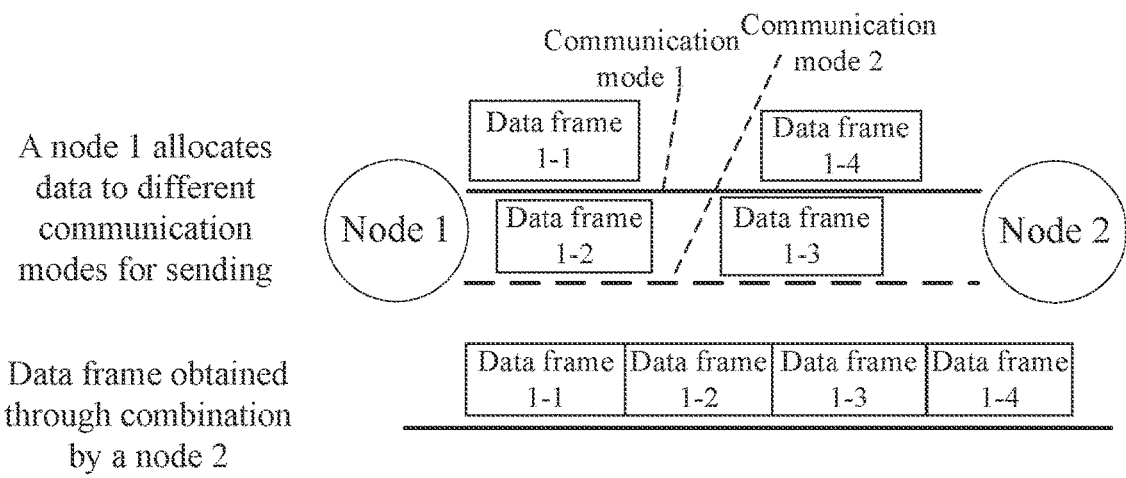
FIG. 9B is a schematic diagram of data combination according to an embodiment of the present disclosure.

Similarly, the second node receives the data frame groups sent in the different modes, and records the sequence number, the source address, the destination address, and other channel status information of the data frame, and then combine data sent in the different modes to form the complete data frame. As shown in FIG. 9B, the node 1 uses the mode 1 to send data frames 1-1 and 1-4, and uses the mode 2 to send data frames 1-2 and 1-3; and the node 2 receives and combines data to obtain a complete data frame sequence (namely, a data frame 1, which includes the data frames 1-1, 1-2, 1-3, and 1-4).

Figure 11:
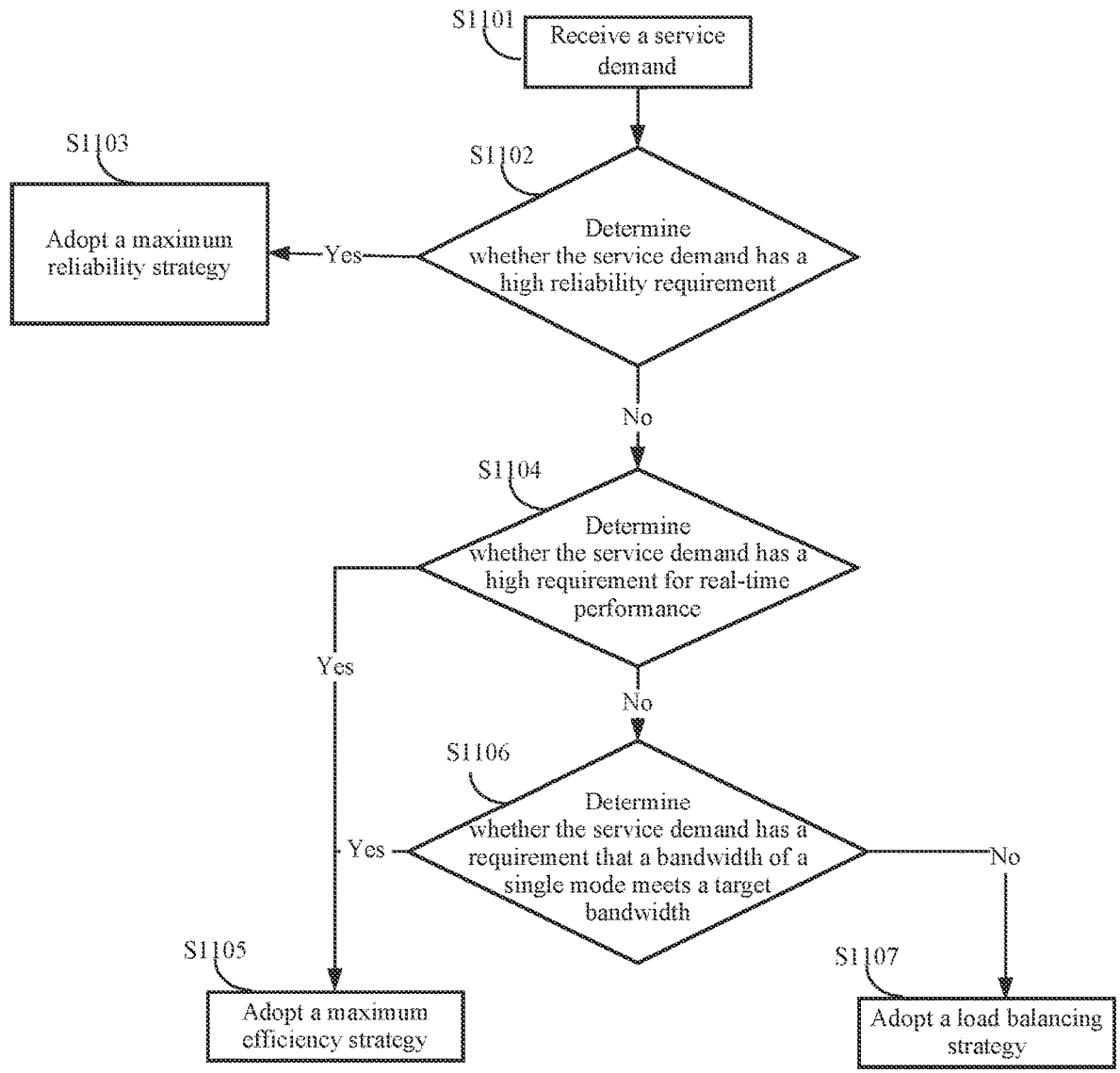
FIG. 11 is a schematic diagram of selecting a different communication strategy based on a type of a service demand according to an embodiment of the present disclosure.

Specifically, a process of selecting a different communication strategy based on a type of a service demand includes following steps S1101 to S1107, as shown in FIG. 11.

Step S1101: Receive a service demand.

Step S1102: Determine whether the service demand has a high reliability requirement; and if the service demand has the high reliability requirement, perform a step S1103; otherwise, perform a step S1104.

Step S1103: Adopt the maximum reliability strategy.

For the data communication with the high reliability requirement such as switching on/off or fee control, a data volume is small in a single communication. Because this type of data communication involves cost settlement and user power-on/off control, there is an extremely high requirement for the communication success rate.

Upon the step S1103, the reliability grade can be considered to adopt a mode with a highest communication success rate and minimum interference or a plurality of modes for communication to ensure corresponding reliability of the communication.

Step S1104: Determine whether the service demand has a high requirement for real-time performance; and if the service requirement has the high requirement for the real-time performance, perform a step S1105; otherwise, perform a step S1106.

Step S1105: Adopt the maximum efficiency strategy.

For application scenarios such as high-frequency collection and transformer region recognition, a data volume of a single communication mode is small, and nodes in a transformer region have a large quantity of centralized communication needs. In order to achieve high efficiency, the maximum efficiency strategy can be adopted.

Upon the step S1105, a mode with a largest bandwidth or the first several modes based on a bandwidth ranking can be used for communication to improve the communication efficiency.

Step S1106: Determine whether the service demand has a requirement that a bandwidth of a single mode meets a target bandwidth; and if the service demand has the requirement that the bandwidth of the single mode meets the target bandwidth, perform the step S1105; otherwise, perform a step S1107.

Step S1107: Adopt the load balancing strategy.

For an application scenario in which frozen data collection, minute-level data collection, and curve data collection are superposed, a data volume collected at a time is large, and a single packet of curve data reaches 2 KB. In the minute-level data collection, communication traffic is very heavy, and each node is required to perform the collection once in 1-5 minutes. Assuming that there are 300 users in a typical transformer region and it is required to perform the collection once every 0.2 s, a channel is very busy. Therefore, collection with a large data volume can be performed in an idle channel mode, or data can be allocated to a plurality of modes for parallel transmission to achieve a load balancing effect.

Upon the step S1107, the data can be allocated to different communication modes based on the communication bandwidth and the channel occupancy rate to achieve load balancing.

The above embodiments can determine a plurality of mutually compatible optimal communication modes between nodes at two adjacent layers, monitor communication quality of the communication modes, and select a most appropriate communication mode from the communication modes based on a service type and a service quality requirement, so as to provide a well-matched communication mode for each application scenario in real time, thus ensuring high-quality communication performance after networking. In addition, after receiving a data packet of one communication protocol, a communication device can also use another communication protocol to forward the data packet if communication quality can be improved.

To sum up, the present disclosure creatively updates networking routing information according to the networking method for a multi-mode communication device; and then performs, based on routing information between a first node and a second node that are located at each two adjacent layers and on a path from a start communication node to a target communication node in the networking routing information, communication between the start communication node and the target communication node. Therefore, the present disclosure can make full use of cooperation between a plurality of communication modes to achieve hybrid networking communication and maximally use channel resources.

The multi-mode communication device supports a plurality of communication modes for concurrent sending, which may generate a large transient power consumption. However, limited by a power supply capacity and a system power consumption of power equipment such as an electric energy meter or a collection terminal, a too large transient power consumption during communication leads to insufficient power supply for the equipment, resulting in resetting, crash, black screen, and other abnormal phenomena. Specifically, in an existing power consumption control method, a plurality of communication modes are staggered by using timeslots, and only one mode is allowed for sending at a same time point. Because this power consumption control method does not consider a priority of the to-be-transmitted data, a mode that needs to be used to transmit high-priority data may be delayed instead, which greatly reduces utilization efficiency of the multi-mode communication, and does not make full use of the cooperation between the communication modes, in other words, does not maximally use the channel resources.

Figure 12:
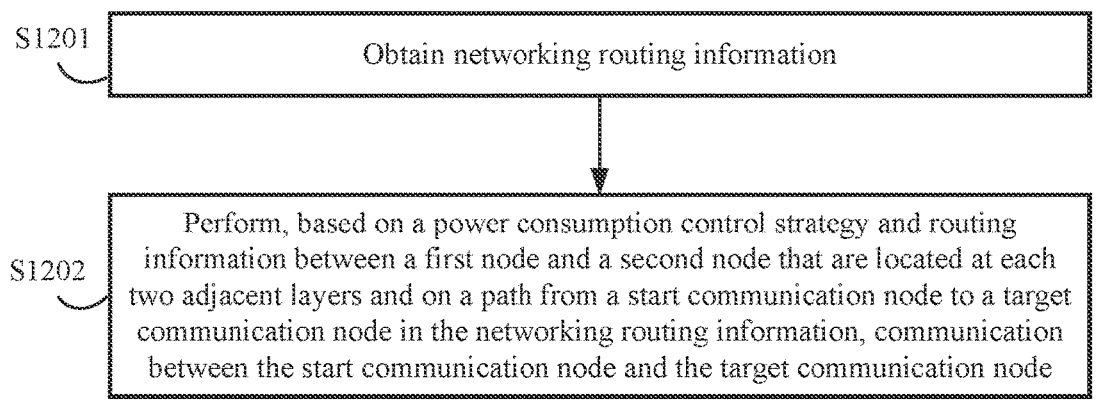
FIG. 12 is a flowchart of a communication method/a power consumption control method for a multi-mode communication device according to an embodiment of the present disclosure.

To resolve the above technical problem, the present disclosure provides a communication method (or a power consumption control method) for a multi-mode communication device. As shown in FIG. 12, the communication method (or the power consumption control method) may include: a step S1201, namely, obtaining networking routing information, where the networking routing information includes routing information between a first node and a second node that are located at each two adjacent layers and on a path from a start communication node to a target communication node, the routing information between the first node and the second node includes an optimal communication mode, in each of a plurality of communication mode sets, between the first node and the second node, communication modes in each of the communication mode sets are not compatible with each other, and communication modes in different communication mode sets are compatible with each other; and a step S1202, namely, performing communication between the start communication node and the target communication node based on a power consumption control strategy and the routing information between the first node and the second node that are located at each two adjacent layers and on the path from the start communication node to the target communication node in the networking routing information. The power consumption control strategy is associated with priorities of data frames to be transmitted in the communication modes.

In the step S1201, the obtaining networking routing information may include: updating the networking routing information according to the above networking method for a multi-mode communication device. In another embodiment, the networking routing information can be determined in advance and stored on a root node, and the obtaining networking routing information may include: obtaining the networking routing information from the root node.

In an embodiment, in the step S1202, the performing communication between the start communication node and the target communication node based on a power consumption control strategy and the routing information between the first node and the second node that are located at each two adjacent layers and on the path from the start communication node to the target communication node in the networking routing information may include: performing communication between the first node and the second node based on the power consumption control strategy and routing information between the first node and the second node that are located at any two adjacent layers.

The performing communication between the first node and the second node based on the power consumption control strategy and routing information between the first node and the second node that are located at any two adjacent layers may include: allocating timeslots to the optimal communication mode in each of the communication mode sets in the routing information, such that at most one optimal communication mode is selected from each of the communication mode sets to obtain a plurality of optimal communication modes, and the optimal communication modes are adopted at the same time in a communication process; determining, based on the optimal communication mode to which the timeslots are allocated in each of the communication mode sets, a plurality of optimal communication modes allocated at a current time point; checking a priority of a data frame to be transmitted in each of the optimal communication modes at the current time point; determining a sum of initial power consumptions of the first N optimal communication modes corresponding to data frames corresponding to the first N priorities as a first total power consumption, and a sum of initial power consumptions of N+1 optimal communication modes corresponding to data frames corresponding to the first N+1 priorities as a second total power consumption; and when the first total power consumption is less than or equal to a power consumption threshold and the second total power consumption is greater than the power consumption threshold, performing the communication between the first node and the second node in the first N optimal communication nodes at the current time point based on respective initial power consumptions of the first N optimal communication modes.

Specifically, the first node can determine, based on the optimal communication mode in each of communication mode sets and to which the timeslots are allocated, optimal communication modes $M_{13}$, $M_{21}$, and $M_{31}$ that are allocated at a time point t0, as shown in FIG. 7. Then, the first node checks that a priority of a data frame to be transmitted in the optimal communication mode $M_{13}$ at the time point t0, a priority of a data frame to be transmitted in the optimal communication mode $M_{21}$ at the time point t0, and a priority of a data frame to be transmitted in the optimal communication mode $M_{31}$ at the time point t0 are a first priority, a second priority, and a third priority respectively (in other words, the priorities of the three data frames gradually decrease). After that, the first node determines that a sum of initial power consumptions of two optimal communication modes (for example, the optimal communication modes $M_{13}$ and $M_{21}$) corresponding to data frames corresponding to the first two priorities is the first total power consumption, and that a sum of initial power consumptions of three optimal communication modes corresponding to data frames corresponding to the first three priorities is the second total power consumption. Finally, if the first total power consumption is less than or equal to the power consumption threshold and the second total power consumption is greater than the power consumption threshold, the two optimal communication modes (for example, the optimal communication modes $M_{13}$ and $M_{21}$) are used to perform the communication between the first node and the second node based on respective initial power consumptions of the two optimal communication modes.

Table 2 Relationship between an optimal communication mode and a communication parameter, a dynamic power consumption, and a communication success rate

| Sequence number | Communication mode | Transmitted power level | Modulation mode | Dynamic power consumption | Communication success rate |
|---|---|---|---|---|---|
| 1 | $M_{13}$ | $LV_{13-1}$ | $TM_{13-1}$ | $P_{13-1}$ | $S_{13-1}$ |
| 2 | $M_{13}$ | $LV_{13-2}$ | $TM_{13-2}$ | $P_{13-2}$ | $S_{13-2}$ |
| 3 | $M_{21}$ | $LV_{21-1}$ | $TM_{21-1}$ | $P_{21-1}$ | $S_{21-1}$ |
| 4 | $M_{21}$ | $LV_{21-2}$ | $TM_{21-2}$ | $P_{21-2}$ | $S_{21-2}$ |
| 5 | $M_{31}$ | $LV_{31-1}$ | $TM_{31-1}$ | $P_{31-1}$ | $S_{31-1}$ |
| 6 | $M_{31}$ | $LV_{31-2}$ | $TM_{31-2}$ | $P_{31-2}$ | $S_{31-2}$ |
| 7 | $M_{31}$ | $LV_{31-3}$ | $TM_{31-3}$ | $P_{31-3}$ | $S_{31-3}$ |
| ... | ... | ... | ... | ... | ... |

-continued

| Sequence number | Communication mode | Transmitted power level | Modulation mode | Dynamic power consumption | Communication success rate |
|---|---|---|---|---|---|
| 8 | $M_{m1}$ | $LV_{m1\text{-}1}$ | $TM_{m1\text{-}1}$ | $P_{m1\text{-}1}$ | $S_{m1\text{-}1}$ |
| 9 | $M_{m1}$ | $LV_{m1\text{-}1}$ | $TM_{m1\text{-}2}$ | $P_{m1\text{-}2}$ | $S_{m1\text{-}2}$ |
| 10 | $M_{m1}$ | $LV_{m1\text{-}2}$ | $TM_{m1\text{-}1}$ | $P_{m1\text{-}1}$ | $S_{m1\text{-}3}$ |

Alternatively, the last two steps of the above process may be specifically as follows: based on an initial transmitted power level (for example, $LV_{13\text{-}1}$ in Table 2) and an initial modulation mode (for example, $TM_{13\text{-}1}$ in Table 2) of an optimal communication mode (for example, $M_{13}$) corresponding to a data frame corresponding to a first-ranked priority, determining an initial power consumption of the optimal communication mode (for example, $M_{13}$); and then determining whether the initial power consumption of the optimal communication mode (for example, $M_{13}$) is less than the power consumption threshold, and if the initial power consumption of the optimal communication mode is less than the power consumption threshold, sending the corresponding data frame in the optimal communication ode (for example, $M_{13}$) based on the initial power consumption of the optimal communication mode (otherwise, adjusting a communication parameter of the optimal communication mode (for example, $M_{13}$) based on the content described below). In a process of sending the corresponding data frame in the optimal communication mode (for example, $M_{13}$) based on the initial power consumption of the optimal communication mode, based on initial transmitted power level (for example, $LV_{21\text{-}2}$ in Table 2) and an initial modulation mode (for example, $TM_{21\text{-}2}$ in Table 2) of an optimal communication mode (for example, $M_{21}$) corresponding to a data frame corresponding to a second-ranked priority, an initial power consumption (for example, $P_{21\text{-}2}$ in Table 2) of the optimal communication mode (for example, $M_{21}$) is determined; and then whether a sum of the initial power consumptions of the optimal communication modes (for example, $M_{13}+M_{21}$) is less than the power consumption threshold, and if the sum of the initial power consumptions of the optimal communication modes is less than the power consumption threshold, the corresponding data frames are sent in the optimal communication modes (for example, $M_{13}+M_{21}$) based on respective initial power consumptions of the optimal communication modes (otherwise, the corresponding data frame is sent in the optimal communication mode (for example, $M_{13}$) based on the initial power consumption of the optimal communication mode, and a communication parameter of the optimal communication mode (for example, $M_{21}$) is adjusted based on the content described below). In a process of sending the corresponding data frames in the optimal communication modes (for example, $M_{13}+M_{21}$) based on respective initial power consumptions of the optimal communication modes, based on an initial transmitted power level (for example, $LV_{31\text{-}1}$ in Table 2) and an initial modulation mode (for example, $TM_{31\text{-}1}$ in Table 2) of an optimal communication mode (for example, $M_{31}$) corresponding to a data frame corresponding to a third-ranked priority, an initial power consumption (for example, $P_{31\text{-}1}$ in Table 2) of the optimal communication mode (for example, $M_{31}$) is determined; and then whether a sum of the initial power consumptions of the optimal communication modes (for example, $M_{13}+M_{21}+M_{31}$) is less than the power consumption threshold, and if the sum of the initial power consumptions of the optimal communication modes is less than the power consumption threshold, the corresponding data frames are sent in the optimal communication modes (for example, $M_{13}+M_{21}+M_{31}$) based on respective initial power consumptions of the optimal communication modes; otherwise, the corresponding data frames are sent in the optimal communication mode (for example, $M_{13}+M_{21}$) based on respective initial power consumptions of the optimal communication modes, and a communication parameter of the optimal communication mode (for example, $M_{31}$) is adjusted based on the content described below.

It should be noted that an initial transmitted power level and an initial modulation mode that are corresponding to each of the above optimal communication modes may be selected based on an actual condition or experience.

When the first total power consumption is less than or equal to the power consumption threshold and the second total power consumption is greater than the power consumption threshold, the operation of performing the communication between the first node and the second node based on the optimal communication mode to which the timeslots are allocated in each of the communication mode sets and the power consumption control strategy (or based on the power consumption control strategy and the routing information between the first node and the second node that are located at any two adjacent layers) may further include: adjusting a communication parameter of an (N+1)th optimal communication mode corresponding to a data frame corresponding to an (N+1)th priority to reduce an initial power consumption of the (N+1)th optimal communication mode to a first power consumption; determining a sum of the first total power consumption and the first power consumption; and when the sum of the first total power consumption and the first power consumption is less than or equal to the power consumption threshold, performing the communication between the first node and the second node in the first N optimal communication modes based on respective initial power consumptions of the first N optimal communication modes and in the (N+1)th optimal communication mode based on the first power consumption.

The communication parameter may include the transmitted power level and/or the modulation mode.

Specifically, in the above embodiment, if the sum of the initial power consumptions of the two optimal communication modes (for example, the optimal communication modes $M_{13}$ and $M_{21}$) corresponding to the two data frames corresponding to the first two priorities (in other words, the first total power consumption) is less than or equal to the power consumption threshold, and the sum of the initial power consumptions of the three optimal communication modes corresponding to the data frames corresponding to the first three priorities (in other words, the second total power consumption) is greater than the power consumption threshold, the communication between the first node and the second node is performed in the two optimal communication modes (for example, the optimal communication modes $M_{13}$ and $M_{21}$) based on respective initial power consumptions of the two optimal communication modes. In addition, communication parameters of the $3^{rd}$ optimal communication mode corresponding to the data frame corresponding to the third-ranked priority can be adjusted to $LV_{31-2}$ and $TM_{31-2}$ in Table 2 respectively to reduce an initial power consumption (for example, $P_{31-1}$ in Table 2) of the $3^{rd}$ optimal communication mode to the first power consumption (for example, $P_{31-2}$ in Table 2). Then a sum of the first power consumption (for example, $P_{31-2}$ in Table 2) and the sum of the initial power consumptions of the two optimal communication modes (for example, the optimal communication modes $M_{13}$ and $M_{21}$) corresponding to the data frames corresponding to the first two priorities (in other words, the first total power consumption) is determined. If the sum of the first total power consumption and the first power consumption is less than or equal to the power consumption threshold, the communication between the first node and the second node is performed in the two optimal communication modes (for example, the optimal communication modes $M_{13}$ and $M_{21}$) based on respective initial power consumptions ($P_{13-1}$ and $P_{21-2}$) of the two optimal communication modes and in the $3^{rd}$ communication mode (for example, $M_{31}$) based on the first power consumption (for example, $P_{31-2}$ in Table 2). Otherwise, description is provided in a next embodiment.

When the first total power consumption is less than or equal to the power consumption threshold and the second total power consumption is greater than the power consumption threshold, the operation of performing the communication between the first node and the second node based on the optimal communication mode to which the timeslots are allocated in each of the communication mode sets and the power consumption control strategy (or based on the power consumption control strategy and the routing information between the first node and the second node that are located at any two adjacent layers) may further include: when the sum of the first total power consumption and the first power consumption is greater than the power consumption threshold, continuously adjusting the communication parameter of the $(N+1)^{th}$ optimal communication mode to reduce the first power consumption of the $(N+1)^{th}$ optimal communication mode to a second power consumption; determining a sum of the first total power consumption and the second power consumption; and when the sum of the first total power consumption and the second power consumption is greater than the power consumption threshold and the second power consumption is a lowest power consumption of the $(N+1)^{th}$ optimal communication mode, performing the communication between the first node and the second node in the first N optimal communication modes based on respective initial power consumptions of the first N optimal communication modes, and delaying start time of the $(N+1)^{th}$ optimal communication mode and another optimal communication mode, where a priority of a data frame to be transmitted in the another optimal communication mode is lower than that of a data frame to be transmitted in the $(N+1)^{th}$ optimal communication mode.

In the above embodiment, if the sum of the first total power consumption and the first power consumption is greater than the power consumption threshold, the communication parameters of the $3^{rd}$ optimal communication mode corresponding to the data frame corresponding to the third-ranked priority are adjusted to $LV_{31-3}$ and $TM_{31-3}$ in Table 2 respectively to reduce the first power consumption (for example, $P_{31-2}$ in Table 2) of the $3^{rd}$ optimal communication mode to the second power consumption (for example, $P_{31-3}$ in Table 2). Then, the sum of the second power consumption (for example, $P_{31-3}$ in Table 2) and the sum of the initial power consumptions of the two optimal communication modes (for example, the optimal communication modes $M_{13}$ and $M_{21}$) corresponding to the data frames corresponding to the first two priorities (in other words, the first total power consumption) is determined. After that, there are three cases: (1) If the sum of the first total power consumption and the first power consumption is greater than the power consumption threshold and the second power consumption (for example, $P_{31-3}$ in Table 2) is the lowest power consumption of the $3^{rd}$ optimal communication mode, the communication between the first node and the second node is performed in the two optimal communication modes (for example, the optimal communication modes $M_{13}$ and $M_{21}$) based on respective initial power consumptions ($P_{13-1}$ and $P_{21-2}$) of the two optimal communication modes, and the $3^{rd}$ optimal communication mode is delayed (if there is another optimal communication mode with a lower priority for a to-be-transmitted data frame after the $3^{rd}$ optimal communication mode, the another optimal communication mode is also delayed). (2) If the sum of the first total power consumption and the first power consumption is less than or equal to the power consumption threshold, the communication between the first node and the second node is performed in the two optimal communication modes (for example, the optimal communication modes $M_{13}$ and $M_{21}$) based on respective initial power consumptions ($P_{13-1}$ and $P_{21-2}$) of the two optimal communication modes and in the $3^{rd}$ communication mode (for example, $M_{31}$) based on the second power consumption (for example, $P_{31-3}$ in Table 2). (3) If the sum of the first total power consumption and the first power consumption is greater than the power consumption threshold and the second power consumption (for example, $P_{31-3}$ in Table 2) is not the lowest power consumption of the $3^{rd}$ optimal communication mode, the communication parameters of the $3^{rd}$ optimal communication mode are continuously adjusted to determine a lower power consumption of the $3^{rd}$ optimal communication mode. Specific details are similar to those about the above adjustment and corresponding communication processes, and are not described herein again.

When the first total power consumption is less than or equal to the power consumption threshold and the second total power consumption is greater than the power consumption threshold, the operation of performing the communication between the first node and the second node based on the optimal communication mode to which the timeslots are allocated in each of the communication mode sets and the power consumption control strategy (or based on the power consumption control strategy and the routing information between the first node and the second node that are located at any two adjacent layers) may further include: determining, based on a correspondence between a power consumption of the $(N+1)^{th}$ optimal communication mode and a communication success rate the $(N+1)^{th}$ optimal communication mode in second preset time before the current time point, a communication success rate of transmitting the data frame in the $(N+1)^{th}$ optimal communication mode based on the first power consumption or the second power consumption; and when the communication success rate of transmitting the data frame in the $(N+1)^{th}$ optimal communication mode based on the first power consumption or the second power consumption is less than a success rate threshold, performing the communication between the first node and the second node in the first N optimal communication modes based on respective initial power consumptions of the first N optimal communication modes, and delaying the start time of the $(N+1)^{th}$ optimal communication mode and the another optimal communication mode, where the priority of the data frame to be transmitted in the another optimal communication mode is lower than that of the data frame to be transmitted in the $(N+1)^{th}$ optimal communication mode.

Specifically, if the first total power consumption is less than or equal to the power consumption threshold and the second total power consumption is greater than the power consumption threshold, a communication success rate $S_{31-2}$ (or $S_{31-3}$) of sending the data frame in the $3^{rd}$ optimal communication mode $M_{31}$ based on the first power consumption $P_{31-2}$ (or the second power consumption $P_{31-3}$) is first determined based on a correspondence between a power consumption of the $3^{rd}$ optimal communication mode and a communication success rate of the $3^{rd}$ optimal communication mode in the second preset time before the current time point, as shown in Table 2. Then, if the communication success rate $S_{31-2}$ (or $S_{31-3}$) of sending the data frame in the $3^{rd}$ optimal communication mode $M_{31}$ based on the first power consumption $P_{31-2}$ (or the second power consumption $P_{31-3}$) is less than the success rate threshold, it indicates that a success rate of sending the data frame in the mode $M_{31}$ based on the first power consumption $P_{31-2}$ (or the second power consumption $P_{31-3}$) is low. Therefore, the communication between the first node and the second node is performed in the two optimal communication modes (for example, the optimal communication modes $M_{13}$ and $M_{21}$) based on respective initial power consumptions ($P_{13-1}$ and $P_{21-2}$) of the two optimal communication modes, and the $3^{rd}$ optimal communication mode $M_{31}$ is delayed (if there is the another optimal communication mode with a lower priority for the to-be-transmitted data frame after the $3^{rd}$ optimal communication mode, the another optimal communication mode is also delayed).

Specifically, a process of performing the communication between the first node and the second node by using the power consumption control strategy is described below, as shown in FIG. 13.

The process of performing the communication between the first node and the second node by using the power consumption control strategy may include following steps S1301 to S1315.

Step S1301: Obtain an optimal communication mode between the first node and the second node in each communication mode set.

Step S1302: Allocate a timeslot to the optimal communication mode in each communication mode set.

Step S1303: Wait for a sending timeslot, and determine a plurality of optimal communication modes at a current time point.

Step S1304: Determine a priority of a data frame to be transmitted in each of the optimal communication modes.

Step S1305: Determine a preset power consumption of an optimal communication mode corresponding to an $i^{th}$ priority.

Step S1306: Determine whether a sum of preset power consumptions of optimal communication modes corresponding to the first i priorities is less than or equal to a power consumption threshold, and if the sum of the preset power consumptions of optimal communication modes corresponding to the first i priorities is less than or equal to the power consumption threshold, perform steps S1307 and S1310; otherwise, perform a step S1311.

Step S1307: Send corresponding data frames of the optimal communication modes corresponding to the first i priorities from the first node to the second node in the optimal communication modes based on corresponding power consumptions of the optimal communication modes.

Step S1308: Take statistics on a communication success rate every second preset time.

The communication success rate can be obtained through statistics based on response information received by the first node from the second node.

Step S1309: Update the communication success rate in a relationship table.

Step S1310: Determine whether i is less than N, and if i is less than N, increase i to i+1 and perform the step S1305; otherwise perform no operation.

N is a quantity of a plurality of optimal communication modes.

Step S1311: Adjust a communication parameter of the optimal communication mode corresponding to the $i^{th}$ priority to reduce an initial power consumption of the optimal communication mode.

Step S1312: Determine whether a communication success rate of the optimal communication mode corresponding to the $i^{th}$ priority is equal to or greater than a success rate threshold, and if the communication success rate of the optimal communication mode corresponding to the $i^{th}$ priority is equal to or greater than the success rate threshold, perform a step S1313; otherwise, perform a step S1315.

Step S1313: Determine a reduced power consumption of the optimal communication mode corresponding to the $i^{th}$ priority.

Step S1314: Determine whether a sum of preset power consumptions of optimal communication modes corresponding to the first i−1 priorities and the reduced power consumption of the optimal communication mode corresponding to the $i^{th}$ priority is less than or equal to the power consumption threshold, and if the sum of the preset power consumptions of optimal communication modes corresponding to the first i−1 priorities and the reduced power consumption of the optimal communication mode corresponding to the $i^{th}$ priority is less than or equal to the power consumption threshold, perform the steps S1307 and S1310; otherwise, perform a step S1315.

Step S1315: Delay the optimal communication mode corresponding to the $i^{th}$ priority and an optimal communication mode corresponding to a lower priority.

To sum up, the present disclosure creatively obtains networking routing information, and performs, based on routing information between a first node and a second node that are located at each two adjacent layers and on a path from a start communication node to a target communication node in the networking routing information, communication between the start communication node and the target communication node. A power consumption control strategy is associated with priorities of data frames to be transmitted in a plurality of communication modes. Therefore, the present disclosure can implement a corresponding power consumption control strategy based on a priority of a data frame, thereby making full use of cooperation between a plurality of communication modes to better adapt to an external power consumption limitation scenario.

The present disclosure further provides a networking system for a multi-mode communication device, applied to a to-be-connected node. The networking system includes: a networking discovery apparatus configured to send response information about available communication modes between a network access node and the to-be-connected node to the network access node by using a networking discovery process, where the available communication modes include communication modes in a plurality of communication mode sets, communication modes in each of the communication mode sets are incompatible with each other, and communication modes in different communication mode sets are compatible with each other; the to-be-connected node is a next-layer node of the network access node; and the response information includes an address of the to-be-connected node and characteristic parameters representing channel quality of the communication mode; and a networking negotiation apparatus configured to: in response to that the network access node selects an optimal communication mode between the network access node and the to-be-connected node from each of the communication mode sets based on the response information, lock the optimal communication mode in each of the communication mode sets as handshake information between the network access node and the to-be-connected node by using a networking negotiation process when a preset negotiation result is met, such that the network access node reports routing information between the network access node and the to-be-connected node to a root node based on the handshake information by using a route establishment process, and the root node updates networking routing information, where at most one optimal communication mode is selected from each of the communication mode sets to obtain a plurality of optimal communication modes, and the optimal communication modes are adopted at the same time in a communication process.

Preferably, the networking discovery apparatus includes: a beacon frame receiving module configured to: in response to that the network access node broadcasts a networking beacon frame in the communication modes in each of the communication mode sets in turn, switch one communication mode in each of the communication mode sets in turn based on a first preset cycle to receive the networking beacon frame; and a response information sending module configured to determine, as a specific communication mode in the available communication modes, a communication mode in which the networking beacon frame is received in each of the communication mode sets, and send response information about the specific communication mode to the network access node.

Preferably, the operation of locking the optimal communication mode in each of the communication mode sets as the handshake information between the network access node and the to-be-connected node by using the networking negotiation process when the preset negotiation result is met includes: in response to that the network access node selects the optimal communication mode between the network access node and the to-be-connected node from each of the communication mode sets based on the response information, and broadcasts a communication mode negotiation frame in the optimal communication mode, where the communication mode negotiation frame includes the optimal communication mode in each of the communication mode sets and the address of the to-be-connected node, performing following operations: receiving the communication mode negotiation frame, locking the optimal communication mode in each of the communication mode sets in the communication mode negotiation frame as the handshake information between the network access node and the to-be-connected node when an actual address of the to-be-connected node matches the address of the to-be-connected node in the communication mode negotiation frame, and feeding back the handshake information to the network access node.

Preferably, the operation of receiving the communication mode negotiation frame includes: switching one communication mode in each of the communication mode sets in turn based on a second preset cycle to receive the communication mode negotiation frame. Accordingly, the operation of locking the optimal communication mode in each of the communication mode sets in the communication mode negotiation frame as the handshake information between the network access node and the to-be-connected node includes: when a quantity of times that the communication mode negotiation frame is received in the optimal communication mode meets a preset quantity and a quantity of times that the actual address is matched meets a preset quantity, locking the optimal communication mode as the handshake information.

Preferably, the networking system further includes: a routing information receiving apparatus configured to: in response to that the root node updates and sends the networking routing information, receive and store the networking routing information; and a role switching apparatus configured to perform a role update operation to update the to-be-connected node to a new network access node.

An embodiment of the present disclosure provides a networking system for a multi-mode communication device, applied to a network access node. The networking system includes: a networking discovery apparatus configured to receive response information about available communication modes between the network access node and a to-be-connected node by using a networking discovery process, where the available communication modes include communication modes in a plurality of communication mode sets, communication modes in each of the communication mode sets are incompatible with each other, and communication modes in different communication mode sets are compatible with each other; the to-be-connected node is a next-layer node of the network access node; and the response information includes an address of the to-be-connected node and characteristic parameters representing channel quality of the communication mode; a networking negotiation apparatus configured to select an optimal communication mode between the network access node and the to-be-connected node from each of the communication mode sets based on the response information by using a networking negotiation process, such that the to-be-connected node locks the optimal communication mode in each of the communication mode sets as handshake information between the network access node and the to-be-connected node when a preset negotiation result is met, where at most one optimal communication mode is selected from each of the communication mode sets to obtain a plurality of optimal communication modes, and the optimal communication modes are adopted at the same time in a communication process; and a route establishment apparatus configured to report routing information between the network access node and the to-be-connected node to a root node based on the handshake information by using a route establishment process, such that the root node updates networking routing information. In this embodiment of the present disclosure, the networking discovery apparatus and the networking negotiation apparatus have different operation representations based on an actual application scenario in to-be-connected and connected stages.

Preferably, the networking discovery apparatus includes: a beacon frame broadcasting apparatus configured to broadcast a networking beacon frame in the communication nodes in each of the communication mode sets in turn; and a response receiving apparatus configured to: in response to that the to-be-connected node determines, as a specific communication mode in the available communication modes, a communication mode in which the networking beacon frame is received in each of the communication mode sets, receive response information about the specific communication mode.

Preferably, the networking negotiation apparatus includes: an optimal mode selection module configured to select the optimal communication mode between the network access node and the to-be-connected node from each of the communication mode sets based on the response information; a negotiation frame broadcasting module configured to broadcast a communication mode negotiation frame in the optimal communication mode, where the communication mode negotiation frame includes the optimal communication mode in each of the communication mode sets and the address of the to-be-connected node, such that the to-be-connected node receives the communication mode negotiation frame, and locks the optimal communication mode in each of the communication mode sets in the communication mode negotiation frame as the handshake information between the network access node and the to-be-connected node when an actual address of the to-be-connected node matches the address of the to-be-connected node in the communication mode negotiation frame; and a handshake information receiving module configured to receive the handshake information.

Preferably, the networking system further includes: an execution apparatus configured to: in response to that the to-be-connected node is updated to a new network access node, perform following operations based on whether the new network access node meets a preset termination condition: if the new network access node does not meet the preset termination condition, locking an optimal communication mode, in each of the communication mode sets, between the new network access node and a next-layer to-be-connected node as handshake information by using the networking discovery process and the networking negotiation process, and reporting, by the new network access node, routing information between the new network access node and the next-layer to-be-connected node to the root node based on the handshake information by using the route establishment process, such that the root node updates the networking routing information; or after receiving a feedback that the root node determines that the new network access node meets the preset termination condition, confirming that content about the new network access node in the networking routing information has been updated.

An embodiment of the present disclosure provides a networking system for a multi-mode communication device, applied to a root node. The networking system is configured to update networking routing information based on routing information between a network access node and a to-be-connected node that is reported according to the networking method for a multi-mode communication device.

In the embodiments of the present disclosure, the beacon frame receiving module, the response information sending module, the optimal mode selection module, the negotiation frame broadcasting module, and the handshake information receiving module each may be one or more processors or chips that each have a communication interface, can realize a communication protocol, and may further include a memory, a related interface and system transmission bus, and the like if necessary. The processor or chip executes program-related code to realize a corresponding function.

The networking discovery apparatus, the networking negotiation apparatus, the routing information receiving apparatus, the role switching apparatus, the route establishment apparatus, the beacon frame broadcasting apparatus, the response receiving apparatus, and the execution apparatus each may be one or more processors or chips that each have a communication interface, can realize a communication protocol, and may further include a memory, a related interface and system transmission bus, and the like if necessary. The processor or chip executes program-related code to realize a corresponding function.

For specific details and benefits of the networking system for a multi-mode communication device in the embodiments of the present disclosure, reference may be made to the above description of the networking system for a multi-mode communication device. Details are not described herein again.

An embodiment of the present disclosure provides a communication system. The communication system includes: a networking system configured to update networking routing information according to the networking method for a multi-mode communication device; and a communication device configured to: based on routing information between a first node and a second node that are located at each two adjacent layers and on a path from a start communication node to a target communication node in the networking routing information, perform communication between the start communication node and the target communication node.

Preferably, that the communication device is configured to perform the communication between the start communication node and the target communication node includes: performing communication between the first node and the second node based on routing information between the first node and the second node that are located at any two adjacent layers. The communication device includes: a timeslot allocation apparatus configured to allocate timeslots to an optimal communication mode in each of a plurality of communication mode sets in the routing information, such that at most one optimal communication mode is selected from each of the communication mode sets to obtain a plurality of optimal communication modes, and the optimal communication modes are adopted at the same time in a communication process; and a communication apparatus configured to perform the communication between the first node and the second node based on the optimal communication mode to which the timeslots are allocated in each of the communication mode sets.

Preferably, the communication apparatus includes: a strategy selection module configured to select a specific mode selection strategy from a plurality of mode selection strategies based on a service type; a first multi-mode determining module configured to determine, based on the optimal communication mode to which the timeslots are allocated in each of the communication mode sets, a plurality of optimal communication modes allocated at a current time point; a statistics module configured to take statistics on channel occupancy rates and communication success rates of the optimal communication modes in second preset time before the current time point; a mode selection module configured to select a specific communication mode from the optimal communication modes based on the specific mode selection strategy and the channel occupancy rates and communication success rates that are obtained through statistics; and a first communication module configured to perform the communication between the first node and the second node in the specific communication mode at the current time point.

Preferably, the mode selection strategies include a maximum efficiency strategy, a maximum reliability strategy, and a load balancing strategy.

Preferably, when the specific communication mode is the maximum efficiency strategy, the mode selection module includes: a first determining unit configured to determine a communication bandwidth of each of the optimal communication modes in the second preset time based on the channel occupancy rates and communication success rates that are obtained through statistics; and a first selection unit configured to select, based on the communication bandwidth of each of the optimal communication modes in the second preset time, the specific communication mode that meets a target communication bandwidth required for to-be-transmitted data from the optimal communication modes, where a communication bandwidth of the specific communication mode is greater than that of any other optimal communication mode among the optimal communication modes.

Preferably, the first selection unit includes: a first sorter configured to rank the optimal communication modes in descending order based on the communication bandwidth; and a first selector configured to perform following operations based on communication bandwidths of the ranked optimal communication modes and the target communication bandwidth: when a communication bandwidth of a first-ranked optimal communication mode is greater than or equal to the target communication bandwidth, determining the first-ranked optimal communication mode as the specific communication mode; or when a total communication bandwidth of the first L optimal communication modes is less than the target communication bandwidth and a total communication bandwidth of the first L+1 optimal communication modes is greater than or equal to the target communication bandwidth, determining the first L+1 optimal communication modes as the specific communication mode, where L is a positive integer.

Preferably, when the specific communication mode is the maximum reliability strategy, the mode selection module includes: a second determining unit configured to determine a communication reliability parameter of each of the optimal communication modes in the second preset time based on the communication success rates that are obtained through statistics; and a second selection unit configured to select the specific communication mode from the optimal communication modes based on a reliability grade required for to-be-transmitted data and the communication reliability parameter of each of the optimal communication modes in the second preset time.

Preferably, the second selection unit includes: a second sorter configured to rank the optimal communication modes in descending order based on the communication reliability parameter; and a second selector configured to perform following operations based on communication reliability parameters of the ranked optimal communication modes and the reliability grade required for the to-be-transmitted data: when the reliability grade required for the to-be-transmitted data is highest, determining the first M optimal communication modes as the specific communication mode, where M is a positive integer; when the reliability grade required for the to-be-transmitted data is moderate, randomly determining one of the first S optimal communication modes as the specific communication mode, where S is a positive integer greater than 1; or when the reliability grade required for the to-be-transmitted data is lowest, randomly determining one of the optimal communication modes as the specific communication mode.

Preferably, when the specific communication mode is the load balancing strategy, the mode selection module includes: a third determining unit configured to determine a communication bandwidth and a channel occupancy rate of each of the optimal communication modes in the second preset time based on the channel occupancy rates and communication success rates that are obtained through statistics; and a third selection unit configured to select, based on the communication bandwidth and the channel occupancy rate of each of the optimal communication modes in the second preset time, the specific communication mode that meets a target communication bandwidth required for to-be-transmitted data from the optimal communication modes, where a channel occupancy rate of the specific communication mode is greater than that of any other optimal communication mode among the optimal communication modes.

Preferably, the third selection unit includes: a third sorter configured to rank the optimal communication modes in ascending order based on the channel occupancy rate; and a third selector configured to: when a total communication bandwidth of the first T optimal communication modes is greater than or equal to the target communication bandwidth, determine the first T optimal communication modes as the specific communication mode, where T is a positive integer.

Preferably, that the communication apparatus is configured to perform the communication between the first node and the second node based on the optimal communication mode to which the timeslots are allocated in each of the communication mode sets includes: performing the communication between the first node and the second node based on the optimal communication mode to which the timeslots are allocated in each of the communication mode sets and a power consumption control strategy.

Preferably, the communication apparatus includes: a first delay module configured to: when a total power consumption of an allocated first optimal communication mode group that is performing communication and an allocated second optimal communication mode group that starts to perform communication at a current time point exceeds a power consumption threshold, delay start time of the second optimal communication mode group to a first time point; a first power consumption determining module configured to determine a total power consumption of an allocated third optimal communication mode group that is performing communication and an allocated fourth optimal communication mode group that starts to perform communication at the first time point; and a second communication module configured to: when the total power consumption of the allocated third optimal communication mode group that is performing the communication and the allocated fourth optimal communication mode group that starts to perform the communication at the first time point is less than or equal to the power consumption threshold, perform, from the current time point to the first time point, the communication between the first node and the second node by using the first optimal communication mode group to which timeslots are allocated, where the fourth optimal communication mode group includes at least the second optimal communication mode group.

Preferably, the communication apparatus includes: a second multi-mode determining module configured to determine, based on the optimal communication mode to which the timeslots are allocated in each of the communication mode sets, a plurality of optimal communication modes allocated at a current time point; a check module configured to check a priority of a data frame to be transmitted in each of the optimal communication modes at the current time point; a second power consumption determining module configured to determine a sum of initial power consumptions of the first N optimal communication modes corresponding to data frames corresponding to the first N priorities as a first total power consumption, and a sum of initial power consumptions of N+1 optimal communication modes corresponding to data frames corresponding to the first N+1 priorities as a second total power consumption; and a third communication module configured to: when the first total power consumption is less than or equal to a power consumption threshold and the second total power consumption is greater than the power consumption threshold, perform the communication between the first node and the second node in the first N optimal communication modes at the current time point based on respective initial power consumptions of the first N optimal communication modes.

Preferably, when the first total power consumption is less than or equal to the power consumption threshold and the second total power consumption is greater than the power consumption threshold, the communication apparatus further includes: an adjustment module configured to adjust a communication parameter of an $(N+1)^{th}$ optimal communication mode corresponding to a data frame corresponding to an $(N+1)^{th}$ priority to reduce an initial power consumption of the $(N+1)^{th}$ optimal communication mode to a first power consumption; a third power consumption determining module configured to determine a sum of the first total power consumption and the first power consumption; and a fourth communication module configured to: when the sum of the first total power consumption and the first power consumption is less than or equal to the power consumption threshold, perform the communication between the first node and the second node in the first N optimal communication modes based on respective initial power consumptions of the first N optimal communication modes and in the $(N+1)^{th}$ optimal communication mode based on the first power consumption.

Preferably, when the first total power consumption is less than or equal to the power consumption threshold and the second total power consumption is greater than the power consumption threshold, the adjustment module is further configured to: when the sum of the first total power consumption and the first power consumption is greater than the power consumption threshold, continuously adjust the communication parameter of the $(N+1)^{th}$ optimal communication mode to reduce the first power consumption of the $(N+1)^{th}$ optimal communication mode to a second power consumption; the third power consumption determining module is further configured to determine a sum of the first total power consumption and the second power consumption; and the fourth communication module is further configured to: when the sum of the first total power consumption and the second power consumption is greater than the power consumption threshold and the second power consumption is a lowest power consumption of the $(N+1)^{th}$ optimal communication mode, perform the communication between the first node and the second node in the first N optimal communication modes based on respective initial power consumptions of the first N optimal communication modes, and delay start time of the $(N+1)^{th}$ optimal communication mode and another optimal communication mode, where a priority of a data frame to be transmitted in the another optimal communication mode is lower than that of a data frame to be transmitted in the $(N+1)^{th}$ optimal communication mode.

Preferably, when the first total power consumption is less than or equal to the power consumption threshold and the second total power consumption is greater than the power consumption threshold, the communication apparatus further includes: a success rate determining module configured to determine, based on a correspondence between a power consumption of the $(N+1)^{th}$ optimal communication mode and a communication success rate of the $(N+1)^{th}$ optimal communication mode in second preset time before the current time point, a communication success rate of transmitting the data frame in the $(N+1)^{th}$ optimal communication mode based on the first power consumption or the second power consumption; and a second delay module configured to: when the communication success rate of transmitting the data frame in the $(N+1)^{th}$ optimal communication mode based on the first power consumption or the second power consumption is less than a success rate threshold, perform the communication between the first node and the second node in the first N optimal communication modes based on respective initial power consumptions of the first N optimal communication modes, and delay the start time of the $(N+1)^{th}$ optimal communication mode and the another optimal communication mode, where the priority of the data frame to be transmitted in the another optimal communication mode is lower than that of the data frame to be transmitted in the $(N+1)^{th}$ optimal communication mode.

Preferably, the communication parameter includes a transmitted power level and/or a modulation mode.

Preferably, the communication system further includes: a data processing apparatus configured to: when the first node or the second node receives a data frame group, perform following operations: filtering, in the data frame group, a data frame duplicate with historical data; and/or combining data frame groups under the optimal communication modes to form a complete data frame.

In the embodiments of the present disclosure, the strategy selection module, the first multi-mode determining module, the statistics module, the mode selection module, the first communication module, the mode selection module, the first delay module, the first power consumption determining module, the second communication module, the second multi-mode determining module, the check module, the second power consumption determining module, the third communication module, the adjustment module, the third power consumption determining module, the fourth communication module, the success rate determining module, and the second delay module each may be one or more processors or chips that each have a communication interface, can realize a communication protocol, and may further include a memory, a related interface and system transmission bus, and the like if necessary. The processor or chip executes program-related code to realize a corresponding function. In the embodiments of the present disclosure, the first determining unit, the first selection unit, the second determining unit, the second selection unit, the third determining unit, and the third selection unit each may be one or more processors or chips that each have a communication interface, can realize a communication protocol, and may further include a memory, a related interface and system transmission bus, and the like if necessary. The processor or chip executes program-related code to realize a corresponding function.

The timeslot allocation apparatus may be one or more processors or chips that each have a communication interface, can realize a communication protocol, and may further include a memory, a display, a related interface and system transmission bus, and the like if necessary. The processor or chip executes program-related code to realize a corresponding function.

The first sorter, the first selector, the second sorter, the second selector, the third sorter, and the third selector each may be one or more processors or chips that each have a communication interface, can realize a communication protocol, and may further include a memory, a related interface and system transmission bus, and the like if necessary. The processor or chip executes program-related code to realize a corresponding function.

For specific details and benefits of the communication system provided in the embodiments of the present disclosure, reference may be made to the above description of the communication method. Details are not described herein again.

An embodiment of the present disclosure provides a computer-readable storage medium. The computer-readable storage medium stores a computer program, and the computer program is executed by a processor to implement the above networking method for a multi-mode communication device and/or the above communication method (or the power consumption control method) for a multi-node communication device.

An embodiment of the present disclosure provides an electronic device. The electronic device includes a processor, and a memory configured to store a computer program executable by the processor. The processor is configured to read the computer program from the memory and execute the computer program to implement the above networking method for a multi-mode communication device and/or the above communication method (or the power consumption control method) for a multi-node communication device.

An embodiment of the present disclosure provides a chip. The chip is configured to execute a computer program, and the computer program is executed by the chip to implement the networking method for a multi-mode communication device and/or the communication method (or the power consumption control method) for a multi-node communication device.

The preferred implementations of the present disclosure are described above in detail with reference to the accompanying drawings, but the present disclosure is not limited to the specific details in the above implementations. Simple variations can be made to the technical solutions of the present disclosure without departing from the technical ideas of the present disclosure, and these simple variations fall within the protection scope of the present disclosure.

In addition, it should be noted that various specific technical features described in the above specific implementations can be combined in any suitable manner in case of no contradiction. To avoid unnecessary repetition, various possible combination modes of the present disclosure are not described separately.

A person skilled in the art can understand that all or some of the steps for implementing the methods in the foregoing embodiments can be completed by a program instructing relevant hardware. The program is stored in a storage medium, and includes a plurality of instructions to enable a single chip microcomputer, a chip, or a processor to perform all or some of the steps in the method described in each embodiment of the present disclosure. The foregoing storage medium includes any medium that can store a program code, such as a universal serial bus (USB) flash disk, a mobile hard disk, a read-only memory (ROM), a random access memory (RAM), a magnetic disk, or an optical disk.

In addition, different implementations of the present disclosure can also be combined arbitrarily. The combinations should also be regarded as the content disclosed in the present disclosure, provided that they do not violate the ideas of the present disclosure.

The invention claimed is:

1. A communication method for a multi-mode communication device, wherein the communication method comprises:

sending, by a to-be-network access node, response information about available communication modes between a network access node and the to-be-connected node to the network access node by using a networking discovery process, wherein the available communication modes comprise communication modes in a plurality of communication mode sets, communication modes in each of the communication mode sets are incompatible with each other, and communication modes in different communication mode sets are compatible with each other; the to-be-connected node is a next-layer node of the network access node; and the response information comprises an address of the to-be-connected node and characteristic parameters representing channel quality of the communication mode;

in response to that the network access node selects an optimal communication mode between the network access node and the to-be-connected node from each of the communication mode sets based on the response information, locking, by the to-be-connected node, the optimal communication mode in each of the communication mode sets as handshake information between the network access node and the to-be-connected node by using a networking negotiation process when a preset negotiation result is met, such that the network access node reports routing information between the network access node and the to-be-connected node to a root node based on the handshake information by using a route establishment process, and the root node updates networking routing information, wherein at most one optimal communication mode is selected from each of the communication mode sets to obtain a plurality of optimal communication modes, and the optimal communication modes are adopted at the same time in a communication process;

updating, by the root node, the networking routing information based on the routing information between the network access node and the to-be-connected node; and based on routing information between a first node and a second node that are located at each two adjacent layers and on a path from a start communication node to a target communication node in the networking routing information, performing communication between the start communication node and the target communication node.

2. The communication method according to claim 1, wherein the performing communication between the start communication node and the target communication node comprises:

performing communication between the first node and the second node based on routing information between the first node and the second node that are located at any two adjacent layers, wherein the performing communication between the first node and the second node based on routing information between the first node and the second node that are located at any two adjacent layers comprises:

allocating timeslots to the optimal communication mode in each of the communication mode sets in the routing information, such that the at most one optimal communication mode is selected from each of the communication mode sets to obtain the optimal communication modes, and the optimal communication modes are adopted at the same time in the communication process; and performing the communication between the first node and the second node based on the optimal communication mode to which the timeslots are allocated in each of the communication mode sets.

3. The communication method according to claim 2, wherein the performing the communication between the first node and the second node based on the optimal communication mode to which the timeslots are allocated in each of the communication mode sets comprises:
selecting a specific mode selection strategy from a plurality of mode selection strategies based on a service type;
determining, based on the optimal communication mode to which the timeslots are allocated in each of the communication mode sets, a plurality of optimal communication modes allocated at a current time point;
taking statistics on channel occupancy rates and communication success rates of the optimal communication modes in second preset time before the current time point;
selecting a specific communication mode from the optimal communication modes based on the specific mode selection strategy and the channel occupancy rates and communication success rates that are obtained through statistics; and
performing the communication between the first node and the second node in the specific communication mode at the current time point.

4. The communication method according to claim 3, wherein the mode selection strategies comprise a maximum efficiency strategy, a maximum reliability strategy, and a load balancing strategy.

5. The communication method according to claim 4, wherein when the specific communication mode is the maximum efficiency strategy, the selecting a specific communication mode from the optimal communication modes comprises:
determining a communication bandwidth of each of the optimal communication modes in the second preset time based on the channel occupancy rates and communication success rates that are obtained through statistics; and
selecting, based on the communication bandwidth of each of the optimal communication modes in the second preset time, the specific communication mode that meets a target communication bandwidth required for to-be-transmitted data from the optimal communication modes, wherein
a communication bandwidth of the specific communication mode is greater than that of any other optimal communication mode among the optimal communication modes.

6. The communication method according to claim 5, wherein the selecting the specific communication mode that meets a target communication bandwidth required for to-be-transmitted data from the optimal communication modes comprises:
ranking the optimal communication modes in descending order based on the communication bandwidth; and
performing following operations based on communication bandwidths of the ranked optimal communication modes and the target communication bandwidth:
when a communication bandwidth of a first-ranked optimal communication mode is greater than or equal to the target communication bandwidth, determining the first-ranked optimal communication mode as the specific communication mode; or
when a total communication bandwidth of the first L optimal communication modes is less than the target communication bandwidth and a total communication bandwidth of the first L+1 optimal communication modes is greater than or equal to the target communication bandwidth, determining the first L+1 optimal communication modes as the specific communication mode, wherein L is a positive integer.

7. The communication method according to claim 4, wherein when the specific communication mode is the maximum reliability strategy, the selecting a specific communication mode from the optimal communication modes comprises:
determining a communication reliability parameter of each of the optimal communication modes in the second preset time based on the communication success rates that are obtained through statistics; and
selecting the specific communication mode from the optimal communication modes based on a reliability grade required for to-be-transmitted data and the communication reliability parameter of each of the optimal communication modes in the second preset time.

8. The communication method according to claim 7, wherein the selecting the specific communication mode from the optimal communication modes based on a reliability grade required for to-be-transmitted data and the communication reliability parameter of each of the optimal communication modes in the second preset time comprises:
ranking the optimal communication modes in descending order based on the communication reliability parameter; and
performing following operations based on communication reliability parameters of the ranked optimal communication modes and the reliability grade required for the to-be-transmitted data:
when the reliability grade required for the to-be-transmitted data is highest, determining the first M optimal communication modes as the specific communication mode, wherein M is a positive integer;
when the reliability grade required for the to-be-transmitted data is moderate, randomly determining one of the first S optimal communication modes as the specific communication mode, wherein S is a positive integer greater than 1; or
when the reliability grade required for the to-be-transmitted data is lowest, randomly determining one of the optimal communication modes as the specific communication mode.

9. The communication method according to claim 4, wherein when the specific communication mode is the load balancing strategy, the selecting a specific communication mode from the optimal communication modes comprises:
determining a communication bandwidth and a channel occupancy rate of each of the optimal communication modes in the second preset time based on the channel occupancy rates and communication success rates that are obtained through statistics; and
selecting, based on the communication bandwidth and the channel occupancy rate of each of the optimal communication modes in the second preset time, the specific communication mode that meets a target communication bandwidth required for to-be-transmitted data from the optimal communication modes, wherein
a channel occupancy rate of the specific communication mode is greater than that of any other optimal communication mode among the optimal communication modes.

10. The communication method according to claim 9, wherein the selecting the specific communication mode that meets a target communication bandwidth required for to-be-transmitted data from the optimal communication modes comprises:
- ranking the optimal communication modes in ascending order based on the channel occupancy rate; and
- when a total communication bandwidth of the first T optimal communication modes is greater than or equal to the target communication bandwidth, determining the first T optimal communication modes as the specific communication mode, wherein T is a positive integer.

11. The communication method according to claim 2, wherein the performing the communication between the first node and the second node based on the optimal communication mode to which the timeslots are allocated in each of the communication mode sets comprises:
- performing the communication between the first node and the second node based on the optimal communication mode to which the timeslots are allocated in each of the communication mode sets and a power consumption control strategy.

12. The communication method according to claim 11, wherein the performing the communication between the first node and the second node based on the optimal communication mode to which the timeslots are allocated in each of the communication mode sets and a power consumption control strategy comprises:
- when a total power consumption of an allocated first optimal communication mode group that is performing communication and an allocated second optimal communication mode group that starts to perform communication at a current time point exceeds a power consumption threshold, delaying start time of the second optimal communication mode group to a first time point;
- determining a total power consumption of an allocated third optimal communication mode group that is performing communication and an allocated fourth optimal communication mode group that starts to perform communication at the first time point; and
- when the total power consumption of the allocated third optimal communication mode group that is performing the communication and the allocated fourth optimal communication mode group that starts to perform the communication at the first time point is less than or equal to the power consumption threshold, performing, from the current time point to the first time point, the communication between the first node and the second node by using the first optimal communication mode group to which timeslots are allocated, wherein
- the fourth optimal communication mode group comprises at least the second optimal communication mode group.

13. The communication method according to claim 11, wherein the performing the communication between the first node and the second node based on the optimal communication mode to which the timeslots are allocated in each of the communication mode sets and a power consumption control strategy comprises:
- determining, based on the optimal communication mode to which the timeslots are allocated in each of the communication mode sets, a plurality of optimal communication modes allocated at a current time point;
- checking a priority of a data frame to be transmitted in each of the optimal communication modes at the current time point;
- determining a sum of initial power consumptions of the first N optimal communication modes corresponding to data frames corresponding to the first N priorities as a first total power consumption, and a sum of initial power consumptions of N+1 optimal communication modes corresponding to data frames corresponding to the first N+1 priorities as a second total power consumption; and
- when the first total power consumption is less than or equal to a power consumption threshold and the second total power consumption is greater than the power consumption threshold, performing the communication between the first node and the second node in the first N optimal communication nodes at the current time point based on respective initial power consumptions of the first N optimal communication modes.

14. The communication method according to claim 13, wherein when the first total power consumption is less than or equal to the power consumption threshold and the second total power consumption is greater than the power consumption threshold, the performing the communication between the first node and the second node based on the optimal communication mode to which the timeslots are allocated in each of the communication mode sets and a power consumption control strategy further comprises:
- adjusting a communication parameter of an $(N+1)^{th}$ optimal communication mode corresponding to a data frame corresponding to an $(N+1)^{th}$ priority to reduce an initial power consumption of the $(N+1)^{th}$ optimal communication mode to a first power consumption;
- determining a sum of the first total power consumption and the first power consumption; and
- when the sum of the first total power consumption and the first power consumption is less than or equal to the power consumption threshold, performing the communication between the first node and the second node in the first N optimal communication modes based on respective initial power consumptions of the first N optimal communication modes and in the $(N+1)^{th}$ optimal communication mode based on the first power consumption.

15. The communication method according to claim 14, wherein when the first total power consumption is less than or equal to the power consumption threshold and the second total power consumption is greater than the power consumption threshold, the performing the communication between the first node and the second node based on the optimal communication mode to which the timeslots are allocated in each of the communication mode sets and a power consumption control strategy further comprises:
- when the sum of the first total power consumption and the first power consumption is greater than the power consumption threshold, continuously adjusting the communication parameter of the $(N+1)^{th}$ optimal communication mode to reduce the first power consumption of the $(N+1)^{th}$ optimal communication mode to a second power consumption;
- determining a sum of the first total power consumption and the second power consumption; and
- when the sum of the first total power consumption and the second power consumption is greater than the power consumption threshold and the second power consumption is a lowest power consumption of the $(N+1)^{th}$ optimal communication mode, performing the communication between the first node and the second node in the first N optimal communication modes based on respective initial power consumptions of the first N optimal communication modes, and delaying start time of the $(N+1)^{th}$ optimal communication mode and another optimal communication mode, wherein a priority of a data frame to be transmitted in the another optimal communication mode is lower than that of a data frame to be transmitted in the $(N+1)^{th}$ optimal communication mode.

16. The communication method according to claim 15, wherein when the first total power consumption is less than or equal to the power consumption threshold and the second total power consumption is greater than the power consumption threshold, the performing the communication between the first node and the second node based on the optimal communication mode to which the timeslots are allocated in each of the communication mode sets and a power consumption control strategy further comprises:
  determining, based on a correspondence between a power consumption of the $(N+1)^{th}$ optimal communication mode and a communication success rate of the $(N+1)^{th}$ optimal communication mode in second preset time before the current time point, a communication success rate of transmitting the data frame in the $(N+1)^{th}$ optimal communication mode based on the first power consumption or the second power consumption; and
  when the communication success rate of transmitting the data frame in the $(N+1)^{th}$ optimal communication mode based on the first power consumption or the second power consumption is less than a success rate threshold, performing the communication between the first node and the second node in the first N optimal communication modes based on respective initial power consumptions of the first N optimal communication modes, and delaying the start time of the $(N+1)^{th}$ optimal communication mode and the another optimal communication mode, wherein the priority of the data frame to be transmitted in the another optimal communication mode is lower than that of the data frame to be transmitted in the $(N+1)^{th}$ optimal communication mode.

17. The communication method according to claim 15, wherein the communication parameter comprises a transmitted power level and/or a modulation mode.

18. The communication method according to claim 2, further comprising:
  when the first node or the second node receives a data frame group, perform following operations: filtering, in the data frame group, a data frame duplicate with historical data; and/or combining data frame groups under the optimal communication modes to form a complete data frame.

19. A communication system for a multi-mode communication device, comprising:
  a networking system for a multi-mode communication device, applied to a root node and configured to update networking routing information based on routing information between a network access node and a to-be-connected node that is reported according to a networking method for a multi-mode communication device, wherein
  the networking method for a multi-mode communication device is applied to the to-be-connected node and comprises:
  sending response information about available communication modes between the network access node and the to-be-connected node to the network access node by using a networking discovery process, wherein the available communication modes comprise communication modes in a plurality of communication mode sets, communication modes in each of the communication mode sets are incompatible with each other, and communication modes in different communication mode sets are compatible with each other; the to-be-connected node is a next-layer node of the network access node; and the response information comprises an address of the to-be-connected node and characteristic parameters representing channel quality of the communication mode;
  in response to that the network access node selects an optimal communication mode between the network access node and the to-be-connected node from each of the communication mode sets based on the response information, locking the optimal communication mode in each of the communication mode sets as handshake information between the network access node and the to-be-connected node by using a networking negotiation process when a preset negotiation result is met, such that the network access node reports the routing information between the network access node and the to-be-connected node to the root node based on the handshake information by using a route establishment process, and the root node updates the networking routing information, wherein
  at most one optimal communication mode is selected from each of the communication mode sets to obtain a plurality of optimal communication modes, and the optimal communication modes are adopted at the same time in a communication process;
  and
  a communication device configured to: based on routing information between a first node and a second node that are located at each two adjacent layers and on a path from a start communication node to a target communication node in the networking routing information, perform communication between the start communication node and the target communication node.

20. The communication system according to claim 19, wherein the operation of performing the communication between the start communication node and the target communication node comprises:
  performing communication between the first node and the second node based on routing information between the first node and the second node that are located at any two adjacent layers, wherein
  the communication device comprises:
  a timeslot allocation apparatus configured to allocate timeslots to the optimal communication mode in each of the communication mode sets in the routing information, such that the at most one optimal communication mode is selected from each of the communication mode sets to obtain the optimal communication modes, and the optimal communication modes are adopted at the same time in the communication process; and
  a communication apparatus configured to perform the communication between the first node and the second node based on the optimal communication mode to which the timeslots are allocated in each of the communication mode sets.

21. The communication system according to claim 20, wherein the communication apparatus comprises:
  a strategy selection module configured to select a specific mode selection strategy from a plurality of mode selection strategies based on a service type;
  a first multi-mode determining module configured to determine, based on the optimal communication mode to which the timeslots are allocated in each of the communication mode sets, a plurality of optimal communication modes allocated at a current time point;
a statistics module configured to take statistics on channel occupancy rates and communication success rates of the optimal communication modes in second preset time before the current time point;
a mode selection module configured to select a specific communication mode from the optimal communication modes based on the specific mode selection strategy and the channel occupancy rates and communication success rates that are obtained through statistics; and
a first communication module configured to perform the communication between the first node and the second node in the specific communication mode at the current time point.

22. The communication system according to claim 21, wherein the mode selection strategies comprise a maximum efficiency strategy, a maximum reliability strategy, and a load balancing strategy.

23. The communication system according to claim 22, wherein when the specific communication mode is the maximum efficiency strategy, the mode selection module comprises:
a first determining unit configured to determine a communication bandwidth of each of the optimal communication modes in the second preset time based on the channel occupancy rates and communication success rates that are obtained through statistics; and
a first selection unit configured to select, based on the communication bandwidth of each of the optimal communication modes in the second preset time, the specific communication mode that meets a target communication bandwidth required for to-be-transmitted data from the optimal communication modes, wherein
a communication bandwidth of the specific communication mode is greater than that of any other optimal communication mode among the optimal communication modes.

24. The communication system according to claim 23, wherein the first selection unit comprises:
a first sorter configured to rank the optimal communication modes in descending order based on the communication bandwidth; and
a first selector configured to perform following operations based on communication bandwidths of the ranked optimal communication modes and the target communication bandwidth:
when a communication bandwidth of a first-ranked optimal communication mode is greater than or equal to the target communication bandwidth, determining the first-ranked optimal communication mode as the specific communication mode; or
when a total communication bandwidth of the first L optimal communication modes is less than the target communication bandwidth and a total communication bandwidth of the first L+1 optimal communication modes is greater than or equal to the target communication bandwidth, determining the first L+1 optimal communication modes as the specific communication mode, wherein L is a positive integer.

25. The communication system according to claim 22, wherein when the specific communication mode is the maximum reliability strategy, the mode selection module comprises:
a second determining unit configured to determine a communication reliability parameter of each of the optimal communication modes in the second preset time based on the communication success rates that are obtained through statistics; and
a second selection unit configured to select the specific communication mode from the optimal communication modes based on a reliability grade required for to-be-transmitted data and the communication reliability parameter of each of the optimal communication modes in the second preset time.

26. The communication system according to claim 25, wherein the second selection unit comprises:
a second sorter configured to rank the optimal communication modes in descending order based on the communication reliability parameter; and
a second selector configured to perform following operations based on communication reliability parameters of the ranked optimal communication modes and the reliability grade required for the to-be-transmitted data:
when the reliability grade required for the to-be-transmitted data is highest, determining the first M optimal communication modes as the specific communication mode, wherein M is a positive integer;
when the reliability grade required for the to-be-transmitted data is moderate, randomly determining one of the first S optimal communication modes as the specific communication mode, wherein S is a positive integer greater than 1; or
when the reliability grade required for the to-be-transmitted data is lowest, randomly determining one of the optimal communication modes as the specific communication mode.

27. The communication system according to claim 22, wherein when the specific communication mode is the load balancing strategy, the mode selection module comprises:
a third determining unit configured to determine a communication bandwidth and a channel occupancy rate of each of the optimal communication modes in the second preset time based on the channel occupancy rates and communication success rates that are obtained through statistics; and
a third selection unit configured to select, based on the communication bandwidth and the channel occupancy rate of each of the optimal communication modes in the second preset time, the specific communication mode that meets a target communication bandwidth required for to-be-transmitted data from the optimal communication modes, wherein
a channel occupancy rate of the specific communication mode is greater than that of any other optimal communication mode among the optimal communication modes.

28. The communication system according to claim 27, wherein the third selection unit comprises:
a third sorter configured to rank the optimal communication modes in ascending order based on the channel occupancy rate; and
a third selector configured to: when a total communication bandwidth of the first T optimal communication modes is greater than or equal to the target communication bandwidth, determine the first T optimal communication modes as the specific communication mode, wherein T is a positive integer.

29. The communication system according to claim 20, wherein the operation of performing the communication between the first node and the second node based on the optimal communication mode to which the timeslots are allocated in each of the communication mode sets comprises:
performing the communication between the first node and the second node based on the optimal communication mode to which the timeslots are allocated in each of the communication mode sets and a power consumption control strategy.

30. The communication system according to claim 29, wherein the communication apparatus comprises:
a first delay module configured to: when a total power consumption of an allocated first optimal communication mode group that is performing communication and an allocated second optimal communication mode group that starts to perform communication at a current time point exceeds a power consumption threshold, delay start time of the second optimal communication mode group to a first time point;
a first power consumption determining module configured to determine a total power consumption of an allocated third optimal communication mode group that is performing communication and an allocated fourth optimal communication mode group that starts to perform communication at the first time point; and
a second communication module configured to: when the total power consumption of the allocated third optimal communication mode group that is performing the communication and the allocated fourth optimal communication mode group that starts to perform the communication at the first time point is less than or equal to the power consumption threshold, perform, from the current time point to the first time point, the communication between the first node and the second node by using the first optimal communication mode group to which a timeslots are allocated, wherein
the fourth optimal communication mode group comprises at least the second optimal communication mode group.

31. The communication system according to claim 29, wherein the communication apparatus comprises:
a second multi-mode determining module configured to determine, based on the optimal communication mode to which the timeslots are allocated in each of the communication mode sets, a plurality of optimal communication modes allocated at a current time point;
a check module configured to check a priority of a data frame to be transmitted in each of the optimal communication modes at the current time point;
a second power consumption determining module configured to determine a sum of initial power consumptions of the first N optimal communication modes corresponding to data frames corresponding to the first N priorities as a first total power consumption, and a sum of initial power consumptions of N+1 optimal communication modes corresponding to data frames corresponding to the first N+1 priorities as a second total power consumption; and
a third communication module configured to: when the first total power consumption is less than or equal to a power consumption threshold and the second total power consumption is greater than the power consumption threshold, perform the communication between the first node and the second node in the first N optimal communication modes at the current time point based on respective initial power consumptions of the first N optimal communication modes.

32. The communication system according to claim 31, wherein when the first total power consumption is less than or equal to the power consumption threshold and the second total power consumption is greater than the power consumption threshold, the communication apparatus further comprises:
an adjustment module configured to adjust a communication parameter of an $(N+1)^{th}$ optimal communication mode corresponding to a data frame corresponding to an $(N+1)^{th}$ priority to reduce an initial power consumption of the $(N+1)^{th}$ optimal communication mode to a first power consumption;
a third power consumption determining module configured to determine a sum of the first total power consumption and the first power consumption; and
a fourth communication module configured to: when the sum of the first total power consumption and the first power consumption is less than or equal to the power consumption threshold, perform the communication between the first node and the second node in the first N optimal communication modes based on respective initial power consumptions of the first N optimal communication modes and in the $(N+1)^{th}$ optimal communication mode based on the first power consumption.

33. The communication system according to claim 32, wherein when the first total power consumption is less than or equal to the power consumption threshold and the second total power consumption is greater than the power consumption threshold,
the adjustment module is further configured to: when the sum of the first total power consumption and the first power consumption is greater than the power consumption threshold, continuously adjust the communication parameter of the $(N+1)^{th}$ optimal communication mode to reduce the first power consumption of the $(N+1)^{th}$ optimal communication mode to a second power consumption;
the third power consumption determining module is further configured to determine a sum of the first total power consumption and the second power consumption; and
the fourth communication module is further configured to: when the sum of the first total power consumption and the second power consumption is greater than the power consumption threshold and the second power consumption is a lowest power consumption of the $(N+1)^{th}$ optimal communication mode, perform the communication between the first node and the second node in the first N optimal communication modes based on respective initial power consumptions of the first N optimal communication modes, and delay start time of the $(N+1)^{th}$ optimal communication mode and another optimal communication mode, wherein a priority of a data frame to be transmitted in the another optimal communication mode is lower than that of a data frame to be transmitted in the $(N+1)^{th}$ optimal communication mode.

34. The communication system according to claim 33, wherein when the first total power consumption is less than or equal to the power consumption threshold and the second total power consumption is greater than the power consumption threshold, the communication apparatus further comprises:
a success rate determining module configured to determine, based on a correspondence between a power consumption of the $(N+1)^{th}$ optimal communication mode and a communication success rate of the $(N+1)^{th}$ optimal communication mode in second preset time before the current time point, a communication success rate of transmitting the data frame in the $(N+1)^{th}$ optimal communication mode based on the first power consumption or the second power consumption; and a second delay module configured to: when the communication success rate of transmitting the data frame in the $(N+1)^{th}$ optimal communication mode based on the first power consumption or the second power consumption is less than a success rate threshold, perform the communication between the first node and the second node in the first N optimal communication modes based on respective initial power consumptions of the first N optimal communication modes, and delay the start time of the $(N+1)^{th}$ optimal communication mode and the another optimal communication mode, wherein the priority of the data frame to be transmitted in the another optimal communication mode is lower than that of the data frame to be transmitted in the $(N+1)^{th}$ optimal communication mode.

35. The communication system according to claim 33, wherein the communication parameter comprises a transmitted power level and/or a modulation mode.

36. The communication system according to claim 19, wherein the communication system further comprises:

a data processing apparatus configured to: when the first node or the second node receives a data frame group, perform following operations: filtering, in the data frame group, a data frame duplicate with historical data; and/or combining data frame groups under the optimal communication modes to form a complete data frame.

37. A non-transitory computer-readable storage medium, wherein the non-transitory computer-readable storage medium stores a computer program, and the computer program is executed by a processor to implement the communication method for a multi-mode communication device according to claim 1.

38. An electronic device, comprising:
a processor; and
a memory configured to store a computer program executable by the processor, wherein
the processor is configured to read the computer program from the memory and execute the computer program to implement the communication method for a multi-mode communication device according to claim 1.

39. A chip, wherein the chip is configured to execute a computer program, and the computer program is executed by the chip to implement the communication method for a multi-mode communication device according to claim 1.

* * * * *